US011248074B2

(12) United States Patent
Ito et al.

(10) Patent No.: US 11,248,074 B2
(45) Date of Patent: Feb. 15, 2022

(54) METHOD FOR PRODUCING COPOLYMER OF POLAR GROUP-CONTAINING ALLYL MONOMER

(71) Applicants: THE UNIVERSITY OF TOKYO, Tokyo (JP); SHOWA DENKO K.K., Tokyo (JP); JAPAN POLYETHYLENE CORPORATION, Tokyo (JP)

(72) Inventors: Shingo Ito, Tokyo (JP); Kyoko Nozaki, Tokyo (JP); Junichi Kuroda, Oita-shi (JP); Yoshikuni Okumura, Oita (JP); Shinya Hayashi, Oita (JP); Minoru Kobayashi, Yokkaichi (JP); Yuichiro Yasukawa, Kawasaki (JP)

(73) Assignees: THE UNIVERSITY OF TOKYO, Tokyo (JP); SHOWA DENKO K.K., Tokyo (JP); JAPAN POLYETHYLENE CORPORATION, Tokyo (JP)

( * ) Notice: Subject to any disclaimer, the term of this patent is extended or adjusted under 35 U.S.C. 154(b) by 0 days.

(21) Appl. No.: 16/963,574

(22) PCT Filed: Jan. 29, 2019

(86) PCT No.: PCT/JP2019/002963
§ 371 (c)(1),
(2) Date: Jul. 21, 2020

(87) PCT Pub. No.: WO2019/163442
PCT Pub. Date: Aug. 29, 2019

(65) Prior Publication Data
US 2021/0054117 A1 Feb. 25, 2021

(30) Foreign Application Priority Data
Feb. 20, 2018 (JP) .............................. JP2018-028030

(51) Int. Cl.
C08F 210/02 (2006.01)
C08F 4/80 (2006.01)
C08F 218/12 (2006.01)

(52) U.S. Cl.
CPC .............. C08F 210/02 (2013.01); C08F 4/80 (2013.01); C08F 218/12 (2013.01)

(58) Field of Classification Search
CPC ........ C08F 212/02; C08F 216/08; C08F 4/80; C08F 16/08; C08F 12/02; B01J 23/56; B01J 27/13; B01J 27/1856
See application file for complete search history.

(56) References Cited

U.S. PATENT DOCUMENTS 8,889,805 B2 11/2014 Ito et al.
8,916,663 B2 12/2014 Nozaki et al.
9,284,390 B2 3/2016 Nozaki et al.
9,303,101 B2 4/2016 Nozaki et al.
9,499,644 B2 11/2016 Ito et al.
2012/0116036 A1* 5/2012 Nozaki ................. C08F 210/02
526/171
2017/0313792 A1* 11/2017 Nozaki ................. C08F 210/16

FOREIGN PATENT DOCUMENTS

JP 2011-068881 A 4/2011
JP 2014-159540 A 9/2014
WO 2012/029432 A1 3/2012
(Continued)

OTHER PUBLICATIONS

Hyatt, ACS Catalysis 2017, 7, 5717-5720 (Year: 2017).*
Gottfried, Macromolecules 2003, 36, 3085-3100 (Year: 2003).*
R.C. Laible, "Allyl Polymerizations", Chem. Rev., 1958, pp. 807-843, vol. 58, No. 808.
(Continued)

Primary Examiner — Robert C Boyle
(74) Attorney, Agent, or Firm — Sughrue Mion, PLLC

(57) ABSTRACT

The present invention relates to a method for producing a copolymer of ethylene and an allyl monomer that is represented by formula (1) and has a polar group, or a copolymer of ethylene, the allyl monomer that is represented by formula (1) and has a polar group, and another monomer. This production method is characterized by using a metal complex, which is represented by general formula (C1), as a polymerization catalyst and by having a silane compound, which is represented by general formula (2) and has a silicon-hydrogen bond, coexist with the metal complex. (In the formulae, the symbols are as defined in the description.) According to the present invention, a copolymer of an allyl monomer that has a polar group is able to be produced with high catalytic activity, said copolymer being capable of having various applications.

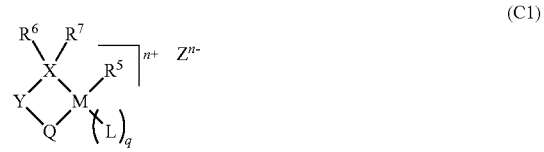

(C1)

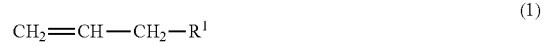

(1)

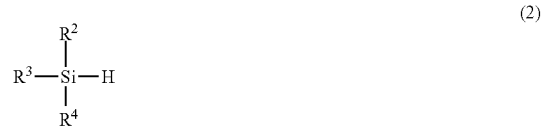

(2)

14 Claims, No Drawings

(56) References Cited

FOREIGN PATENT DOCUMENTS

| WO | 2013/168626 A1 | 11/2013 |
| WO | 2016/067776 A1 | 5/2016 |

OTHER PUBLICATIONS

Shingo Ito et al., "Coordination-Insertion Copolymerization of Allyl Monomers with Ethylene", J. Am. Chem. Soc., 2011, pp. 1232-1235, vol. 133.
International Search Report of PCT/JP2019/002963 dated May 7, 2019 [PCT/ISA/210].

* cited by examiner

METHOD FOR PRODUCING COPOLYMER OF POLAR GROUP-CONTAINING ALLYL MONOMER

CROSS REFERENCE TO RELATED APPLICATIONS

This application is a National Stage of International Application No. PCT/JP2019/002963, filed Jan. 29, 2019, claiming priority to Japanese Patent Application No. 2018-028030, filed Feb. 20, 2018.

FIELD

The present invention relates to a method for producing a copolymer of an allyl monomer having a polar group.

BACKGROUND

Copolymers of olefins, such as ethylene and propylene, which are nonpolar monomers, and vinyl monomers having a polar group, have functionality and characteristics which are not found in nonpolar polyethylene and polypropylene, and are used in a wide range of fields. For example, an ethylene-vinyl alcohol copolymer (EVOH) is a copolymer composed of an ethylene monomer structural unit and a vinyl alcohol monomer structural unit, and is produced by saponifying an ethylene-vinyl acetate copolymer obtained by radical copolymerization of ethylene and vinyl acetate. EVOH is used in a wide range of fields, such as food packaging applications, by utilizing its excellent gas-barrier properties.

On the other hand, polymerization of an allyl monomer having a polar group, such as allyl acetate or allyl alcohol, is more difficult than that of an ordinary vinyl monomer, and polymers thereof are hardly known. The main reason for this is that when the allyl monomer is radically polymerized, the growth reaction of the polymer is extremely slow because of the degenerative chain transfer reaction to the monomer by abstraction of a hydrogen atom present on the allylic carbon, and only oligomers with a low degree of polymerization are obtained (Chem. Rev. 58, 808 (1958); NPL 1).

JP 2011-68881 A (PTL 1), WO 2013/168626 (PTL 2) and J. Am. Chem. Soc., 133, 1232 (2011) (NPL 2) describe coordination copolymerization of ethylene and a polar group-containing allyl monomer using a metal complex catalyst of Group 10 of the Periodic Table, and have succeeded in the synthesis of a copolymer of a polar group-containing allyl monomer, which has not been obtained by a radical polymerization method. JP 2014-159540 A (PTL 3) and WO 2016/067776 (PTL 4) describe that further improvement of the catalyst described in the aforementioned documents enables production of polymers having molecular weights at levels which can be formed into various molded articles. However, from the viewpoint of catalyst cost, catalytic activity and polymer productivity per unit catalyst are not sufficient, and there remains a problem for industrialization.

CITATION LIST

Patent Literature

[PTL 1] JP 2011-68881 A (U.S. Pat. Nos. 8,916,663, 9,284,390)
[PTL 2] WO 2013/168626 (U.S. Pat. No. 9,303,101)
[PTL 3] JP 2014-159540 A (U.S. Pat. No. 9,499,644)
[PTL 4] WO 2016/067776 (US 2017/0313792)

Non Patent Literature

[NPL 1] Chem. Rev. 58, 808 (1958)
[NPL 2] J. Am. Chem. Soc., 133, 1232 (2011)

SUMMARY

Technical Problem

It is an object of the present invention to provide a method for producing a copolymer of an allyl monomer having a polar group with higher catalytic activity by using a metal complex of Group 10 of the Periodic Table as a catalyst.

Solution to Problem

As a result of intensive studies to solve the aforementioned problems, the present inventors have found that a copolymer of an allyl monomer having a polar group capable of being applied to various applications can be produced with high catalytic activity by copolymerizing ethylene and an allyl monomer having a polar group in the coexistence of a silane compound having one or more silicon-hydrogen bonds (Si—H) by using a metal complex of Group 10 of the Periodic Table as a catalyst, thereby completing the present invention.

That is, the present invention relates to a method for producing a copolymer of the following [1] to [13].

[1] A method for producing a copolymer of ethylene and an allyl monomer having a polar group represented by formula (1)

$$CH_2=CH-CH_2-R^1 \qquad (1)$$

wherein $R^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group having 2 to 10 carbon atoms (oxycarbonyl group; R—O—(C=O)—, R is an organic group), an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom, or a copolymer of ethylene, the allyl monomer having a polar group represented by formula (1) and another monomer, the method characterized by using a metal complex represented by formula (C1)

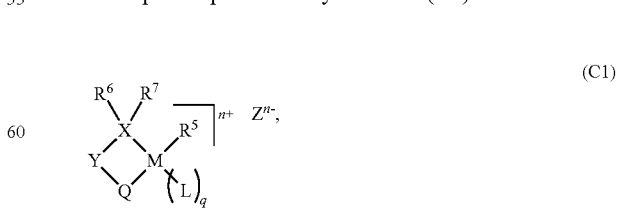

wherein M represents an element of Group 10 of the Periodic Table, X represents a phosphorus atom (P) or an arsenic atom (As), and Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—SiH$_2$—), Q represents an anionic ligand selected from —S(=O)$_2$—O—, —C(=O)—O—, —P(=O)(—OH)—O—, —O—, and —S—, or a neutral ligand selected from —P(—R$^8$)(—R$^9$)=O, and —C(—R$^{10}$)=O, wherein R$^8$, R$^9$ and R$^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group, wherein the bonding mode is Y—S(=O)$_2$—O-M, Y—C(=O)—O-M, Y—P(=O)(—OH)—O-M, Y—O-M, Y—S-M, Y—P(—R$^8$)(—R$^9$)=O-M, or Y—C(—R$^{10}$)=O-M, R$^5$ represents a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms, R$^6$ and R$^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group, and may be bonded to each other to form a ring structure, L represents an electron-donating ligand and R$^5$ and L may form a ring, q is 0, ½, 1 or 2, n represents the charge of an organometallic compound and is 0 or 1, Z$^{n-}$ represents a counteranion of a cationic organometallic compound and when n is 0, it is not present, as a catalyst and by allowing a silane compound having one or more silicon-hydrogen bonds (Si—H) to coexist during polymerization.

[2] The method for producing a copolymer as described in [1], wherein the silane compound having one or more silicon-hydrogen bonds (Si—H) is a silane compound represented by formula (2)

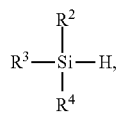

(2)

wherein R$^2$, R$^3$ and R$^4$ each independently represent a substituent selected from the group consisting of a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, and a substituted or unsubstituted aryl group having 6 to 30 carbon atoms, and R$^2$, R$^3$ and R$^4$ may be bonded to each other to form a ring structure.

[3] The method for producing a copolymer as described in [2], wherein R$^2$, R$^3$ and R$^4$ in formula (2) are each independently a hydrogen atom, an alkoxy group having 1 to 20 carbon atoms, a substituted or unsubstituted alkyl group having 1 to 30 carbon atoms, or a substituted or unsubstituted aryl group having 6 to 30 carbon atoms.

[4] The method for producing a copolymer as described in any one of [1] to [3], wherein n is 0 and Q is Q$^1$ in formula (C1), that is, the catalyst used is a metal complex represented by formula (C2)

(C2)

wherein X, Y, M, L, q, R$^5$, R$^6$ and R$^7$ represent the same meanings as described in formula (C1) and Q$^1$ represents an anionic ligand selected from —S(=O)$_2$—O—, —C(=O)—O—, —P(=O)(—OH)—O—, —O—, and —S—.

[5] The method for producing a copolymer as described in [4], wherein Q$^1$ in formula (C2) is —S(=O)$_2$—O—, that is, the catalyst used is a metal complex represented by formula (C4)

(C4)

wherein X, Y, M, L, q, R$^5$, R$^6$ and R$^7$ represent the same meanings as described in formula (C1).

[6] The method for producing a copolymer as described in [4] or [5], wherein Y in formula (C2) is a substituted or unsubstituted phenylene group, a substituted or unsubstituted methylene group, or a substituted or unsubstituted imino group.

[7] The method for producing a copolymer as described in any one of [4] to [6], wherein R$^6$ and R$^7$ in formula (C2) are both an alkyl group having 3 to 20 carbon atoms.

[8] The method for producing a copolymer as described in any one of [1] to [3], wherein n is 1 and Q is Q$^2$ in formula (C1), that is, the catalyst used is a metal complex represented by formula (C3)

(C3)

wherein X, Y, M, L, q, R$^5$, R$^6$, R$^7$, and Z have the same meanings as described in formula (C1), and Q$^2$ represents a neutral ligand selected from —P(—R$^8$)(—R$^9$)=O, and —C(—R$^1$)=O, wherein R$^8$, R$^9$ and R$^{10}$ represent the same meanings as described in formula (C1).

[9] The method for producing a copolymer as described in [8], wherein Y in formula (C3) is a substituted or unsubstituted phenylene group, a substituted or unsubstituted methylene group, or a substituted or unsubstituted imino group.

[10] The method for producing a copolymer as described in [8] or [9], wherein $R^6$ and $R^7$ in formula (C3) are both an alkyl group having 3 to 20 carbon atoms.

[11] The method for producing a copolymer as described in any one of [1] to [3] and [8] to [10], wherein Z in formula (C1) and formula (C3) is one selected from $SbF_6$, $BPh_4$, $BArF_4$ ($ArF_4=[3,5-(CF_3)_2C_6H_3]_4$), $BF_4$ and $PF_6$.

[12] The method for producing a copolymer as described in any one of [1] to [11], wherein the allyl monomer having a polar group represented by formula (1) is allyl acetate ($R^1$ in formula (1) is an acetoxy group ($CH_3C(=O)-O-$)).

[13] The method for producing a copolymer as described in any one of [1] to [12], wherein, in a copolymerization reaction of ethylene and the allyl monomer having a polar group represented by formula (1), or in a copolymerization reaction of ethylene, the allyl monomer having a polar group represented by formula (1), and another monomer, the silane compound having one or more silicon-hydrogen bonds is added by continuous feed or intermittent feed after the start of the polymerization reaction.

Advantageous Effects of Invention

A copolymer of an allyl monomer having a polar group can be produced with high catalytic activity, and low production costs can be achieved.

DESCRIPTION OF EMBODIMENTS

[Catalyst]
(Structure of Metal Complex)

The structure of a catalyst comprising a metal complex of Group 10 of the Periodic Table used in the present invention is represented by formula (C1).

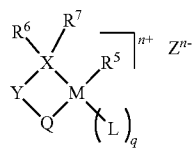

(C1)

In the formula, M represents an element of Group 10 of the Periodic Table, X represents a phosphorus atom (P) or an arsenic atom (As), and Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—$SiH_2$—). Q represents an anionic ligand selected from —S(=O)$_2$—O—, —C(=O)—O—, —P(=O)(—OH)—O—, —O—, and —S—, or a neutral ligand selected from —P(—$R^8$)(—$R^9$)=O, and —C(—$R^{10}$)=O. $R^8$, $R^9$ and $R^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group. In this case, the binding mode is Y—S(=O)$_2$—O-M, Y—C(=O)—O-M, Y—P(=O)(—OH)—O-M, Y—O-M, Y—S-M, Y—P(—$R^8$)(—$R^9$)=O-M, or Y—C(—$R^{10}$)=O-M. $R^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms. $R^6$ and $R^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group, and may be bonded to each other to form a ring structure. L represents an electron-donating ligand, and $R^5$ and L may form a ring. q is 0, ½, 1 or 2. n represents the number of charges of an organometallic compound, and is 0 or 1. $Z^{n-}$ represents a counteranion of a cationic organometallic compound, and is absent when n is 0.

As used herein, "hydrocarbon" includes saturated and unsaturated aliphatic hydrocarbons and aromatic hydrocarbons.

Hereinafter, the structure of formula (C1) will be described.

M represents an element of Group 10 of the Periodic Table. Elements of Group 10 of the Periodic Table include Ni, Pd, and Pt. Ni and Pd are preferable from the viewpoint of catalytic activity and the molecular weight of an obtained polymer, and Pd is more preferable.

X is a phosphorus atom (P) or an arsenic atom (As), and is two-electron coordinated to the central metal M. X is preferably P from the viewpoint of availability and catalyst cost.

Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—$SiH_2$—).

Examples of unsubstituted arylene groups having 6 to 30 carbon atoms include a 1,2-phenylene group, a 1,2-naphthylene group, a 2,3-naphthylene group, and a 1,8-naphthylene group, and a 1,2-phenylene group and a 1,2-naphthylene group are preferable in view of availability of a raw material and easy synthesis of a catalyst.

One or more substituents may be present in the aforementioned unsubstituted arylene group. Specific examples of substituents include a methyl group, an ethyl group, a 1-propyl group, an isopropyl group, a 1-butyl group, an isobutyl group, a sec-butyl group, a t-butyl group, a phenyl group, a 2-methoxyphenyl group, a 3-methoxyphenyl group, a 4-methoxyphenyl group, a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group, a 1-naphthyl group, a 2-naphthyl group, a 1-anthracenyl group, a 2-anthracenyl group, a 9-anthracenyl group, a methoxy group, an ethoxy group, a propoxy group, an isopropoxy group, a butoxy group, an isobutoxy group, a sec-butoxy group, a t-butoxy group, a phenoxy group, an amino group, a monomethylamino group, a monoethylamino group, a mono(n-propyl)amino group, a mono(isopropyl)amino group, a mono(n-butyl)amino group, a mono (isobutyl)amino group, a mono(sec-butyl)amino group, a mono(t-butyl)amino group, a dimethylamino group, a diethylamino group, a di(n-propyl)amino group, a diisopropylamino group, a di(n-butyl)amino group, a di(isobutyl) amino group, a di(sec-butyl)amino group, a di(t-butyl)amino group, a monophenylamino group, a monobenzylamino group, a trimethylsilyl group, a triethylsilyl group, a tri(n-propyl)silyl group, a tri(isopropyl)silyl group, a t-butyldimethylsilyl group, a t-butyldiphenylsilyl group, a fluoro group, a bromo group, a chloro group, an iodo group, a trifluoromethyl group, a pentafluoroethyl group, a heptafluoropropyl group, and a nonafluorobutyl group. When a plurality of substituents are present, they may be the same or different.

Examples of unsubstituted alkylene groups having 1 to 20 carbon atoms include a methylene group, a 1,2-ethylene group, a dimethylmethylene group, a diethylmethylene group, a monomethylmethylene group, a monoethylmethylene group, a 1-methyl-1,2-ethylene group, a 1-ethyl-1,2-ethylene group, a 1,2-dimethyl-1,2-ethylene group, a 1,2-diethyl-1,2-ethylene group, a 1,1-dimethyl-1,2-ethylene group, a 1,1-diethyl-1,2-ethylene group, a 1,1,2-trimethyl-1,2-ethylene group, a 1,1,2-triethyl-1,2-ethylene group, a 1,1,2,2-tetramethyl-1,2-ethylene group, and a 1,1,2,2-tetraethyl-1,2-ethylene group.

One or more substituents may be present in the aforementioned unsubstituted alkylene group. Examples of substituents include an aryl group, an alkoxy group, an aryloxy group, a silyl group, and an oxo group (=O).

Specific examples of substituted alkylene groups having 1 to 20 carbon atoms include a diphenylmethylene group, a monophenylmethylene group, a mono(trimethylsilyl)methylene group, a di(trimethylsilyl)methylene group, a di(2-methoxyphenyl)methylene group, a mono(2-methoxyphenyl)methylene group, a di(3-methoxyphenyl)methylene group, a mono(3-methoxyphenyl)methylene group, a di(4-methoxyphenyl)methylene group, a mono(4-methoxyphenyl)methylene group, a di(2,6-dimethoxyphenyl)methylene group, a mono(2,6-dimethoxyphenyl)methylene group, a di(2,5-dimethoxyphenyl)methylene group, a mono(2,5-dimethoxyphenyl)methylene group, a di(2,4-dimethoxyphenyl)methylene group, a mono(2,4-dimethoxyphenyl)methylene group, a di(2,3-dimethoxyphenyl)methylene group, a mono(2,3-dimethoxyphenyl)methylene group, a di(3,5-dimethoxyphenyl)methylene group, a mono(3,5-dimethoxyphenyl)methylene group, a di(2,4,6-trimethoxyphenyl) methylene group, a mono(2,4,6-trimethoxyphenyl) methylene group, a di(2,4,6-trimethylphenyl)methylene group, a mono(2,4,6-trimethylphenyl)methylene group, a di(2-isopropylphenyl)methylene group, a mono(2-isopropylphenyl)methylene group, a di(2,6-diisopropylphenyl)methylene group, a mono(2,6-diisopropylphenyl)methylene group, a di(1-naphthyl)methylene group, a mono(1-naphthyl)methylene group, a di(2-naphthyl)methylene group, a mono(2-naphthyl)methylene group, a dimethoxymethylene group, a diethoxymethylene group, a dipropoxymethylene group, a diisopropoxymethylene group, a monophenoxymethylene group, a diphenoxymethylene group, a 1,2-ethanedioxymethylene group, a 1,3-propanedioxymethylene group, a 1-phenyl-1,2-ethylene group, a 1,2-diphenyl-1,2-ethylene group, a 1,1,2-triphenyl-1,2-ethylene group, a 1,1, 2,2-tetraphenyl-1,2-ethylene group, and a carbonyl (—C (=O)—) group.

The substituted or unsubstituted alkylene group having 1 to 20 carbon atoms is preferably a methylene group, a monomethylmethylene group, a dimethylmethylene group, a diphenylmethylene group, or a monophenylmethylene group, from the viewpoint of availability of a raw material and easy synthesis of a catalyst.

Examples of unsubstituted cycloalkylene groups having 3 to 30 carbon atoms include a cis-cyclopropane-1,2-yl group, a trans-cyclopropane-1,2-yl group, a cis-cyclobutane-1,2-yl group, a trans-cyclobutane-1,2-yl group, a cis-cyclopentane-1,2-yl group, a trans-cyclopentane-1,2-yl group, a cis-cyclohexane-1,2-yl group, a trans-cyclohexane-1,2-yl group, a cis-cycloheptane-1,2-yl group, a trans-cycloheptane-1,2-yl group, a cis-cyclooctane-1,2-yl group, and a trans-cyclooctane-1,2-yl group. A cis-cyclopentane-1,2-yl group, a trans-cyclopentane-1,2-yl group, a cis-cyclohexane-1,2-yl group, and a trans-cyclohexane-1,2-yl group are preferable in view of availability of a raw material and easy synthesis of a catalyst.

One or more substituents may be present in aforementioned the unsubstituted cycloalkylene group. Specific examples of the substituents are the same as the above specific examples of the substituent when the substituent is present in the unsubstituted arylene group. When a plurality of substituents are present, they may be the same or different.

Examples of substituents in the substituted or unsubstituted imino group (—NH—) include an alkyl group having 1 to 5 carbon atoms, an alkoxycarbonyl group having 2 to 10 carbon atoms, an aryl group having 6 to 20 carbon atoms which may have an alkyl group or an alkoxy group, and an aralkyl group having 6 to 20 carbon atoms.

Specific examples of substituted or unsubstituted imino groups (—NH—) include an imino group, an N-methylimino group, an N-ethylimino group, an N-(n-propyl)imino group, an N-isopropylimino group, an N-(n-butyl)imino group, an N-(sec-butyl)imino group, an N-(t-butyl)imino group, an N-benzylimino group, an N-phenylimino group, an N-trimethylsilylimino group, an N-(2-methoxyphenyl) imino group, an N-(3-methoxyphenyl)imino group, an N-(4-methoxyphenyl)imino group, an N-(2,6-dimethoxyphenyl) imino group, an N-(2,5-dimethoxyphenyl)imino group, an N-(2,4-dimethoxyphenyl)imino group, an N-(2,3-dimethoxyphenyl)imino group, an N-(3,5-dimethoxyphenyl) imino group, an N-(2,4,6-trimethoxyphenyl)imino group, an N-(2,4,6-trimethylphenyl)imino group, an N-(1-naphthyl) imino group, an N-(2-naphthyl)imino group, and an N-(t-butoxycarbonyl)imino group.

An imino group, an N-methylimino group, an N-benzylimino group, and an N-(t-butoxycarbonyl)imino group are preferable in view of easy synthesis of a catalyst.

Examples of substituted or unsubstituted silylene groups (—SiH$_2$—) include a silylene group, a dimethylsilylene group, a diethylsilylene group, a monomethylsilylene group, a monoethylsilylene group, a diphenylsilylene group, a monophenylsilylene group, a mono(trimethylsilyl)silylene group, a di(trimethylsilyl)silylene group, a di(2-methoxyphenyl)silylene group, a mono(2-methoxyphenyl)silylene group, a di(3-methoxyphenyl)silylene group, a mono(3-methoxyphenyl)silylene group, a di(4-methoxyphenyl)silylene group, a mono(4-methoxyphenyl)silylene group, a di(2,6-dimethoxyphenyl)silylene group, a mono(2,6-dimethoxyphenyl)silylene group, a di(2,5-dimethoxyphenyl)silylene group, a mono(2,5-dimethoxyphenyl)silylene group, a di(2,4-dimethoxyphenyl)silylene group, a mono(2,4-dimethoxyphenyl)silylene group, a di(2,3-dimethoxyphenyl)silylene group, a mono(2,3-dimethoxyphenyl)silylene group, a di(3,5-dimethoxyphenyl)silylene group, a mono(3,5-dimethoxyphenyl)silylene group, a di(2,4,6-trimethoxyphenyl)silylene group, a mono(2,4,6-trimethoxyphenyl)silylene group, a di(2,4,6-trimethylphenyl)silylene group, a mono(2,4,6-trimethylphenyl)silylene group, a di(2-isopropylphenyl)silylene group, a mono(2-isopropylphenyl)silylene group, a di(2,6-diisopropylphenyl)silylene group, a mono(2,6-diisopropylphenyl)silylene group, a di(1-naphthyl)silylene group, a mono(1-naphthyl)silylene group, a di(2-naphthyl)silylene group, a mono(2-naphthyl)silylene group, a dimethoxysilylene group, a diethoxysilylene group, a dipropoxysilylene group, a diisopropoxysilylene group, a 1,2-ethanedioxysilylene group, and a 1,3-propanedioxysilylene group. A silylene group, a monomethylsilylene group, a dimethylsilylene group, a diphenylsilylene group, and a monomethylsilylene group are preferable in view of ease synthesis of a catalyst.

In formula (C1), Q represents an anionic ligand selected from —S(=O)$_2$—O—, —C(=O)—O—, —P(=O)(—OH)—O—, —O—, and —S—, or a neutral ligand selected from —P(—R$^8$)(—R$^9$)=O, and —C(—R$^{10}$)=O. R$^8$, R$^9$ and R$^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group. In this case, the binding mode is Y—S(=O)$_2$—O-M, Y—C(=O)—O-M, Y—P(=O)(—OH)—O-M, Y—O-M, Y—S-M, Y—P(—R$^8$)(—R$^9$)=O-M, or Y—C(—R$^{10}$)=O-M.

When Q or Q$^2$ is —P(—R$^8$)(—R$^9$)=O, R$^8$ and R$^9$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group.

The alkoxy group represented by R$^8$ or R$^9$ preferably has 1 to 20 carbon atoms, and examples thereof include a methoxy group, an ethoxy group, a 1-propoxy group, an isopropoxy group, a 1-butoxy group, an isobutoxy group, a sec-butoxy group, and a t-butoxy group. The aryloxy group represented by R$^8$ or R$^9$ preferably has 6 to 24 carbon atoms, and examples thereof include a phenoxy group. Examples of amino groups represented by R$^8$ or R$^9$ include an amino group, a monomethylamino group, a dimethylamino group, a monoethylamino group, and a diethylamino group.

Examples of hydrocarbon groups having 1 to 30 carbon atoms represented by R$^8$ or R$^9$, which may be substituted with one or more groups selected from a halogen atom, an alkoxy group, an aryloxy group, and an amino group, include an alkyl group (including chained alkyl groups, cycloalkyl groups, and bridged cycloalkyl groups), a phenyl group, and a naphthyl group. As a halogen atom as the substituent, a fluorine atom is preferable. The alkoxy group, aryloxy group, and amino group as the substituent are preferably the same as the alkoxy group, aryloxy group, and amino group represented by the aforementioned R$^8$ or R$^9$.

Specific examples of hydrocarbon groups having 1 to 30 carbon atoms represented by R$^8$ or R$^9$, which may be substituted with one or more groups selected from a halogen atom, an alkoxy group, an aryloxy group, and an amino group, include a methyl group, an ethyl group, an n-propyl group, an isopropyl group, an n-butyl group, an isobutyl group, a sec-butyl group, a t-butyl group, a n-pentyl group, a 2-pentyl group, a 3-pentyl group, an neopentyl group, an n-hexyl group, a 2-hexyl group, a 3-hexyl group, a 2-heptyl group, a 3-heptyl group, a 4-heptyl group, a 2-methyl-4-heptyl group, a 2,6-dimethyl-4-heptyl group, a 3-methyl-4-heptyl group, a cyclopropyl group, a cyclobutyl group, a cyclopentyl group, a cyclohexyl group, a cycloheptyl group, a cyclooctyl group, a 1-adamantyl group, a 2-adamantyl group, a menthyl group, a trifluoromethyl group, a benzyl group, a 2'-methoxybenzyl group, a 3'-methoxybenzyl group, a 4'-methoxybenzyl group, a 4'-trifluoromethylbenzyl group, a phenyl group, a 2-methylphenyl group, a 3-methylphenyl group, a 4-methylphenyl group, a 2,6-dimethylphenyl group, a 3,5-dimethylphenyl group, a 2,4,6-trimethylphenyl group, a 2-isopropylphenyl group, a 3-isopropylphenyl group, a 4-isopropylphenyl group, a 2,6-diisopropylphenyl group, a 3,5-diisopropylphenyl group, a 2,4,6-triisopropylphenyl group, a 2-t-butylphenyl group, a 2-cyclohexylphenyl group, a 2-methoxyphenyl group, a 3-methoxyphenyl group, a 4-methoxyphenyl group, a 2,6-dimethoxyphenyl group, a 3,5-dimethoxyphenyl group, a 2,4,6-trimethoxyphenyl group, a 4-fluorophenyl group, a pentafluorophenyl group, a 4-trifluoromethylphenyl group, a 3,5-bis(trifluoromethyl)phenyl group, a 1-naphthyl group, a 2-naphthyl group, a 2-furyl group, a 2-biphenyl group, a 2',6'-dimethoxy-2-biphenyl group, a 2'-methyl-2-biphenyl group, and a 2',4',6'-triisopropyl-2-biphenyl group.

From the viewpoint of catalytic activity, R$^8$ and R$^9$ are preferably a methyl group, an ethyl group, an isopropyl group, a t-butyl group, or a phenyl group, and more preferably a methyl group.

R$^8$ and R$^9$ may be the same or different. R$^6$ and R$^7$ may be bonded to form a ring structure.

R$^{10}$ where Q or Q$^2$ is —C(—R$^{10}$)=O represents a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group. Specific examples of R$^{10}$ are the same as the specific examples of R$^8$ and R$^9$ described above. From the viewpoint of catalytic activity, R$^{10}$ is preferably a methyl group, a trifluoromethyl group or a phenyl group.

R$^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms.

Preferred examples of halogen atoms represented by R$^5$ are fluorine, chlorine and bromine. Among these, chlorine is preferable.

The hydrocarbon group having 1 to 30 carbon atoms represented by R$^5$ is preferably a hydrocarbon group having 1 to 13 carbon atoms, and is an alkyl group, a cycloalkyl group, an aryl group, or an aralkyl group.

Preferred examples include a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, a 1,1-dimethyl-2-phenylethyl group, an isopropyl group, a 1-dimethylpropyl group, a 1,1,2-trimethylpropyl group, a 1,1-diethylpropyl group, a 1-phenyl-2-propyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a cyclooctyl group, a cyclododecyl group, a 1-adamantyl group, a 2-adamantyl group, an exo-norbonyl group, an end-norbonyl group, a 2-bicyclo[2.2.2]octyl group, a nopinyl group, a decahydronaphthyl group, a menthyl group, a neomenthyl group, a neopentyl group, a 5-decyl group, a phenyl group, a naphthyl group, an anthracenyl group, a fluorenyl group, a tolyl group, a xylyl group, a benzyl group, and a 4-ethylphenyl group.

Among these, a more preferable group is a methyl group or a benzyl group, and particularly preferably is a methyl group.

The hydrocarbon group having 1 to 30 carbon atoms substituted with a halogen atom represented by $R^5$ is preferably a group in which the aforementioned hydrocarbon group having 1 to 30 carbon atoms is substituted with fluorine, chlorine or bromine, and preferred examples include a trifluoromethyl group or a pentafluorophenyl group.

The hydrocarbon group having 2 to 30 carbon atoms substituted with an alkoxy group having 1 to 10 carbon atoms represented by $R^5$ is preferably a group in which the aforementioned hydrocarbon group having 1 to 30 carbon atoms is substituted with a methoxy group, an ethoxy group, an isopropoxy group, a 1-propoxy group, a 1-butoxy group, or a t-butoxy group. More preferred are hydrocarbon groups having 2 to 6 carbon atoms substituted with a methoxy group or an ethoxy group. Specifically, they include a 1-(methoxymethyl)ethyl group, a 1-(ethoxymethyl)ethyl group, a 1-(phenoxymethyl)ethyl group, a 1-(methoxyethyl)ethyl group, a 1-(ethoxyethyl)ethyl group, a di(methoxymethyl)methyl group, a di(ethoxymethyl)methyl group, and a di(phenoxymethyl)methyl group. Particularly preferred are a 1-(methoxymethyl)ethyl group and a 1-(ethoxymethyl)ethyl group.

The hydrocarbon group having 7 to 30 carbon atoms substituted with an aryloxy group having 6 to 20 carbon atoms represented by $R^5$ is preferably a group in which the aforementioned hydrocarbon group having 1 to 30 carbon atoms is substituted with a phenoxy group, a 4-methylphenoxy group, a 4-methoxyphenoxy group, a 2,6-dimethylphenoxy group, or a 2,6-di-t-butylphenoxy group. More preferred are hydrocarbon groups having 1 to 6 carbon atoms substituted with a phenoxy group or a 2,6-dimethylphenoxy group, and particularly preferred are a 1-(phenoxymethyl)ethyl group and a 1-(2,6-dimethylphenoxymethyl)ethyl group.

The hydrocarbon group having 3 to 30 carbon atoms substituted with an amido group having 2 to 10 carbon atoms (R—(C=O)NH—, R is an organic group) represented by $R^5$ is preferably a substituent in which the aforementioned hydrocarbon group having 1 to 30 carbon atoms is substituted with an acetamido group, a propionylamino group, a butyrylamino group, an isobutyrylamino group, a valerylamino group, an isovalerylamino group, a pivaloylamino group, or a benzoylamino group. More preferred are a 2-acetamidophenyl group, a 2-propionylaminophenyl group, a 2-valerylaminophenyl group, and a 2-benzoylaminophenyl group, and particularly preferred is a 2-acetamidophenyl group.

When $R^5$ is a hydrocarbon group substituted with an amido group, the carbonyl oxygen of the amido group can be coordinated to M to form a ring structure without using an electron-donating ligand L separately. That is, $R^5$ can also serve as L. In this case, it is referred to as $R^5$ and L forming a ring. Specifically, a 2-acetamidophenyl group, a 2-propionylaminophenyl group, a 2-valerylaminophenyl group, and a 2-benzoylaminophenyl group correspond to this case. The case of the 2-acetamidophenyl group is shown in the following chemical formula.

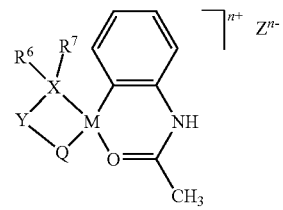

The alkoxy group having 1 to 30 carbon atoms represented by $R^5$ is preferably an alkoxy group having 1 to 6 carbon atoms, and preferred examples thereof include a methoxy group, an ethoxy group, an isopropoxy group, a 1-propoxy group, a 1-butoxy group, and a t-butoxy group. Among these, a more preferable group is a methoxy group, an ethoxy group, or an isopropoxy group, and particularly preferred is a methoxy group.

The aryloxy group having 6 to 30 carbon atoms represented by $R^5$ is preferably an aryloxy group having 6 to 12 carbon atoms, and preferable examples thereof include a phenoxy group, a 4-methylphenoxy group, a 4-methoxyphenoxy group, a 2,6-dimethylphenoxy group, and a 2,6-di-t-butylphenoxy group. Among these, a more preferable group is a phenoxy group or a 2,6-dimethylphenoxy group, and particularly preferred is a phenoxy group.

The acyloxy group having 2 to 10 carbon atoms represented by $R^5$ is preferably an acyloxy group having 2 to 8 carbon atoms, and preferred examples include an acetoxy group, a propionyloxy group, a butyryloxy group, an isobutyryloxy group, a valeryloxy group, an isovaleryloxy group, a pivaloyloxy group, and a benzoyloxy group.

Among these, a more preferable group is an acetoxy group, a propionyloxy group, or a benzoyloxy group, and particularly preferred are an acetoxy group and a propionyloxy group.

Among the preferred groups as $R^5$, more preferred are hydrocarbon groups having 1 to 20 carbon atoms, alkoxy groups having 1 to 30 carbon atoms, hydrocarbon groups having 3 to 30 carbon atoms substituted with an amido group having 2 to 10 carbon atoms, and acyloxy groups having 2 to 10 carbon atoms, and particularly preferred examples include a methyl group, a benzyl group, a methoxy group, a 2-acetamidophenyl group, and an acetyloxy group.

$R^6$ and $R^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group.

The alkoxy group represented by $R^6$ or $R^7$ preferably has 1 to 20 carbon atoms, and examples thereof include a methoxy group, an ethoxy group, a propoxy group, and an isopropoxy group.

The aryloxy group represented by $R^6$ or $R^7$ preferably has 6 to 24 carbon atoms, and examples thereof include a phenoxy group.

Examples of silyl groups represented by $R^6$ or $R^7$ include a trimethylsilyl group, a triethylsilyl group, a tri(n-propyl)

silyl group, and a tri(isopropyl)silyl group. Examples of amino groups include an amino group, a monomethylamino group, a dimethylamino group, a monoethylamino group, and a diethylamino group.

Examples of hydrocarbon groups in the hydrocarbon group having 1 to 120 carbon atoms which may be substituted with one or more groups selected from a halogen atom, an alkoxy group, and an aryloxy group represented by $R^6$ or $R^7$ include an alkyl group (including chained alkyl groups, cycloalkyl groups, and bridged cycloalkyl groups), a phenyl group, and a naphthyl group, with an alkyl group having 3 to 20 carbon atoms being preferred. As a halogen atom as the substituent, a fluorine atom is preferable. The alkoxy group and the aryloxy group as the substituent are preferably the same as the alkoxy group and the aryloxy group represented by the aforementioned $R^6$ or $R^7$.

Specific examples of hydrocarbon groups having 1 to 120 carbon atoms which may be substituted with one or more groups selected from a halogen atom, an alkoxy group, and an aryloxy group, represented by $R^6$ or $R^7$ include a methyl group, an ethyl group, an n-propyl group, an isopropyl group, an n-butyl group, an isobutyl group, a sec-butyl group, a t-butyl group, an n-pentyl group, a 2-pentyl group, a 3-pentyl group, a 2-methyl-2-pentyl group, a neopentyl group, an n-hexyl group, a 2-hexyl group, a 3-hexyl group, a 2-heptyl group, a 3-heptyl group, a 4-heptyl group, a 2-methyl-4-heptyl group, a 2,6-dimethyl-4-heptyl group, a 3-methyl-4-heptyl group, a cyclopropyl group, a cyclobutyl group, a cyclopentyl group, a cyclohexyl group, a cycloheptyl group, a cyclooctyl group, a 1-adamantyl group, a 2-adamantyl group, a menthyl group (a menthyl group, a neomenthyl group, an isomenthyl group, and a neoisomenthyl group are collectively referred to as the menthyl group), a trifluoromethyl group, a benzyl group, a 2'-methoxybenzyl group, a 3'-methoxybenzyl group, a 4'-methoxybenzyl group, a 4'-trifluoromethylbenzyl group, a phenyl group, a 2-methylphenyl group, a 3-methylphenyl group, a 4-methylphenyl group, a 2,6-dimethylphenyl group, a 3,5-dimethylphenyl group, a 2,4,6-trimethylphenyl group, a 2-isopropylphenyl group, a 3-isopropylphenyl group, a 4-isopropylphenyl group, a 2,6-diisopropylphenyl group, a 3,5-diisopropylphenyl group, a 2,4,6-triisopropylphenyl group, a 2-t-butylphenyl group, a 2-cyclohexylphenyl group, a 2-methoxyphenyl group, a 3-methoxyphenyl group, a 4-methoxyphenyl group, a 2,6-dimethoxyphenyl group, a 3,5-dimethoxyphenyl group, a 2,4,6-trimethoxyphenyl group, a 4-fluorophenyl group, a pentafluorophenyl group, a 4-trifluoromethylphenyl group, a 3,5-bis(trifluoromethyl) phenyl group, a 1-naphthyl group, a 2-naphthyl group, a 2-furyl group, a 2-biphenyl group, a 2',6'-dimethoxy-2-biphenyl group, a 2'-methyl-2-biphenyl group, and a 2',4',6'-triisopropyl-2-biphenyl group. From the viewpoint of catalytic activity and the molecular weight of an obtained copolymer, $R^6$ and $R^7$ are preferably an isopropyl group, a t-butyl group, a 4-heptyl group, a 2,6-dimethyl-4-heptyl group, a cyclohexyl group, a 1-adamantyl group, a 2-adamantyl group or a menthyl group, and more preferably an isopropyl group, a t-butyl group or a menthyl group.

$R^6$ and $R^7$ may be the same or different. $R^6$ and $R^7$ may be bonded to form a ring structure.

The electron-donating ligand (L) is a compound having an electron-donating group and capable of coordinating with the metal atom M to stabilize the metal complex. As described above, when $R^5$ is a hydrocarbon group substituted with an amido group, the carbonyl oxygen of the amido group can be coordinated to M to form a ring structure. That is, $R^5$ also serves as L, and L forms a ring with $R^5$.

Examples of the electron-donating ligand (L) having a sulfur atom include dimethylsulfoxide (DMSO). Examples of the electron-donating ligand (L) having a nitrogen atom include a trialkylamine having alkyl groups having 1 to 10 carbon atoms, a dialkylamine having alkyl groups having 1 to 10 carbon atoms, pyridine, 2,6-dimethylpyridine (also known as 2,6-lutidine), aniline, 2,6-dimethylaniline, 2,6-diisopropylaniline, N,N,N',N'-tetramethylethylenediamine (TMEDA), 4-(N,N-dimethylamino)pyridine (DMAP), acetonitrile, benzonitrile, quinoline, and 2-methylquinoline. Examples of the electron-donating ligand (L) having an oxygen atom include diethyl ether, tetrahydrofuran, and 1,2-dimethoxyethane. Dimethylsulfoxide (DMSO), pyridine, 2,6-dimethylpyridine (also known as 2,6-lutidine), and N,N,N',N'-tetramethylethylenediamine (TMEDA) are preferable, and dimethylsulfoxide (DMSO), and 2,6-dimethylpyridine (also known as 2,6-lutidine) are more preferable, from the viewpoint of stabilization and catalytic activity of the metal complex.

q is 0, ½, 1 or 2.

In the case of isolating the metal complex of formula (C1), a metal complex stabilized by coordination of an electron-donating ligand (L) beforehand may be used. In this case, q is ½, 1 or 2. q of ½ means that one divalent electron-donating ligand is coordinated to two metal complexes. It is preferable that q be ½ or 1 in terms of stabilizing the metal complex catalyst. By q being 0, it is meant that there is no ligand.

n represents the number of charges of the organometallic compound, and is 0 or 1. $Z^{n-}$ represents a counteranion of a cationic organometallic compound and is absent when n is 0.

$Z^-$ corresponding to the case where n is 1 represents a counteranion of a cationic organometallic complex. The counteranion represented by $Z^-$ may be any monovalent anion. Further, $Z^-$ may be a polyvalent anion as long as the number of charges per atom of the central metal (M) is a monovalent. Examples of Z include a sulfate ion ($SO_4^{2-}$); a nitrate ion ($NO_3^-$); a carbonate ion ($CO_3^{2-}$); a perchlorate ion ($ClO_4^-$); halide ions, such as a chloride ion ($Cl^-$), a bromide ion ($Br^-$), and iodide ion ($I^-$); borate ions, such as tetrafluoroborate ($BF_4^-$), bromotrifluoroborate ($BBrF_3^-$), chlorotrifluoroborate ($BClF_3^-$), trifluoromethoxyborate ($BF_3(OCH_3)^-$)), trifluoroethoxyborate ($BF_3(OC_2H_5)^-$), trifluoroallyloxyborate ($BF_3(OC_3H_5)^-$), tetraphenylborate ($B(C_6H_5)_4^-$), tetrakis(3,5-bis(trifluoromethyl)phenyl)borate ($B(3,5-(CF_3)_2C_6H_3)_4^-$=$BArF_4^-$), bromotriphenylborate ($BBr(C_6H_5)_3^-$), chlorotriphenylborate ($BCl(C_6H_5)_3^-$), methoxytriphenylborate ($B(OCH_3)(C_6H_5)_3^-$), ethoxytriphenylborate ($B(OC_2H_5)(C_6H_5)_3^-$), allyloxytriphenylborate ($B(OC_3H_5)(C_6H_5)_3^-$), tetrakis(pentafluorophenyl)borate ($B(C_6F_5)_4^-$), bromotris(pentafluorophenyl)borate ($BBr(C_6F_5)_3^-$), chlorotris(pentafluorophenyl)borate ($BCl(C_6F_5)_3^-$), methoxytris(pentafluorophenyl)borate ($B(OCH_3)(C_6F_5)_3^-$), ethoxytris(pentafluorophenyl)borate ($B(OC_2H_5)(C_6F_5)_3^-$), and allyloxytris(pentafluorophenyl)borate ($B(OC_3H_5)(C_6F_5)_3^-$); sulfonate ions, such as methanesulfonate ($CH_3SO_3^-$), trifluoromethanesulfonate ($CF_3SO_3^-$), nonafluorobutanesulfonate ($C_4F_9SO_3^-$), benzenesulfonate ($C_6H_5SO_3^-$), and p-toluenesulfonate (p-$CH_3^-C_6H_4SO_3^-$); carboxylate ions, such as an acetate ion ($CH_3CO_2^-$), a trifluoroacetate ion ($CF_3CO_2^-$), a trichloroacetate ion ($CCl_3CO_2^-$), a propionate ion ($C_2H_5CO_2^-$), and a benzoate ion ($C_6H_5CO_2^-$); phosphate ions, such as hexafluorophosphate (PF$_6^-$); arsenate ions, such as a hexafluoroarsenate ion (AsF$_6^-$); antimonate ions, such as hexafluoroantimonate (SbF$_6^-$); and silicate anions, such as hexafluorosilicate (SiF$_6^-$). Among these counter ions, Z$^-$ is preferably SbF$_6^-$, BPh$_4^-$, BArF$_4^-$, BF$_4^-$ or PF$_6^-$, from the viewpoint of availability of a raw material and catalytic activity.

The value of n and the presence or absence of Z$^{n-}$ are determined by the type of Q. When Q is an anionic ligand selected from —S(=O)$_2$—O—, —C(=O)—O—, —P(=O)(—OH)—O—, —O—, and —S—, n is 0 and the metal complex represented by formula (C1) is a neutral organometallic compound, so there is no Z$^{n-}$ which is a counteranion. That is, in this case, the metal complex represented by formula (C1) can be represented by formula (C2)

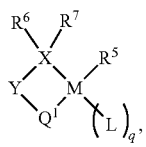

(C2)

wherein X, Y, M, L, q, R$^5$, R$^6$, and R$^7$ represent the same meanings as those described in formula (C1), and Q$^1$ represents an anionic ligand selected from —S(=O)$_2$—O—, —C(=O)—O—, —P(=O)(—OH)—O—, —O—, and —S—.

Q represents an anionic ligand selected from —S(=O)$_2$—O—, —C(=O)—O—, —P(=O)(—OH)—O—, —O—, and —S—. In this case, the bonding mode is Y—S(=O)$_2$—O-M, Y—C(=O)—O-M, Y—P(=O)(—OH)—O-M, Y—O-M, or Y—S-M, with one electron coordinated to the metal atom M. From the viewpoint of catalytic activity, Q$^1$ is particularly preferably —S(=O)$_2$—O—. In this case, the catalyst structure is represented by formula (C4).

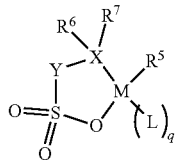

(C4)

On the other hand, when Q is a neutral ligand selected from —P(—R$^8$)(—R$^9$)=O and —C(—R$^{10}$)=O, n is 1 and the counteranion is Z$^-$. That is, in this case, the metal complex represented by formula (C1) can be represented by formula (C3)

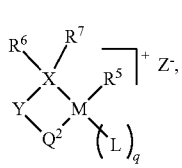

(C3)

wherein X, Y, M, L, q, R$^5$, R$^6$, R, and Z represent the same meanings as formula (C1), and Q$^2$ represents a neutral ligand selected from —P(—R$^8$)(—R$^9$)=O and —C(—R$^{10}$)=O, wherein R$^8$, R$^9$ and R$^{10}$ represent the same meanings as formula (C1).

Q$^2$ represents a neutral ligand selected from —P(—R$^8$)(—R$^9$)=O and —C(—R$^{10}$)=O. In this case, the bonding mode is Y—P(—R$^8$)(—R$^9$)=O-M or Y—C(—R$^{10}$)=O-M, with two electrons coordinated to the metal atom M. Q$^2$ being —C(—R$^{10}$)=O provides the structure of formula (C5). The symbols in the formula represent the same meanings as those of formula (C1).

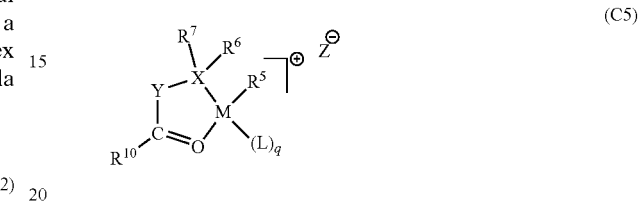

(C5)

(Method for Producing Metal Complex)

A metal complex which is a catalyst represented by formula (C1) can be synthesized by a method similar to that described in the known literature (e.g., J. Am. Chem. Soc. 2012, 134, 8802). That is, a zero- or di-valent M source is reacted with a ligand in formula (C1). When the metal complex represented by formula (C1) is one represented by formula (C3), a monovalent metal salt is reacted to synthesize the metal complex, in order to further introduce a counteranion Z$^-$, after reacting the M source with the ligand.

Examples of zero-valent M sources include tris(dibenzylideneacetone)dipalladium as a palladium source, and tetracarbonylnickel(0): Ni(CO)$_4$, and bis(1,5-cyclooctadiene)nickel as a nickel source.

Examples of divalent M sources include (1,5-cyclooctadiene)(methyl)palladium chloride, palladium chloride, palladium acetate, bis(acetonitrile)dichloropalladium: PdCl$_2$(CH$_3$CN)$_2$, bis(benzonitrile)dichloropalladium: PdCl$_2$(PhCN)$_2$, (N,N,N',N'-tetramethylethylenediamine) dichloropalladium: PdCl$_2$(TMEDA), (N,N,N',N'-tetramethylethylenediamine)dimethylpalladium(II): PdMe$_2$(TMEDA), bis(acetylacetonato)palladium(II): Pd(acac)$_2$ (acac=acetylacetonato), and palladium(II) trifluoromethanesulfonate: Pd(OSO$_2$CF$_3$)$_2$ as a palladium source, and (allyl)nickel chloride, (allyl)nickel bromide, nickel chloride, nickel acetate, bis(acetylacetonato)nickel(II): Ni(acac)$_2$, (1,2-dimethoxyethane)dichloronickel(II): NiCl$_2$(DME), and nickel(II) trifluoromethanesulfonate: Ni(OSO$_2$CF$_3$)$_2$ as a nickel source.

The metal complex represented by formula (C1) can be isolated and used. A metal source containing M and a ligand precursor can be contacted in a reaction system and directly (in situ) subjected to polymerization without isolating the complex. In particular, when R$^5$ in formula (C1) is a hydrogen atom, it is preferable that a metal source containing a zero-valent M and a ligand be reacted, and then subjected to polymerization without isolating the complex.

The ratio of the M source (M) to the ligand (C1 ligand) in formula (C1) ((C1 ligand)/M) is preferably selected from the range of 0.5 to 2.0, and more preferably the range of 1.0 to 1.5.

The metal complex represented by formula (C1) can also be supported on a carrier and used for polymerization. The carrier in this case is not particularly limited, and examples thereof include an inorganic carrier, such as silica gel and alumina, and an organic carrier, such as polystyrene, polyethylene, and polypropylene. Examples of a method for supporting the metal complex include a physical adsorption method in which a solution of the metal complex is impregnated in a carrier and dried, and a method in which the metal complex is chemically coupled to the carrier and supported thereon.

[Monomer]

In the method for producing a copolymer according to the present invention, an allyl monomer having a polar group to be copolymerized with ethylene is represented by formula (2)

$$CH_2=CH-CH_2-R^1 \qquad (2)$$

In the formula, R represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group having 2 to 10 carbon atoms, an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom.

$R^1$ being an alkoxy group having 1 to 10 carbon atoms is preferably an alkoxy group having 1 to 4 carbon atoms, and preferred examples thereof include a methoxy group, an ethoxy group, an isopropoxy group, a 1-propoxy group, a 1-butoxy group, and a t-butoxy group.

Among these, a more preferable substituent is a methoxy group, an ethoxy group, or an isopropoxy group, and particularly preferred is a methoxy group.

$R^1$ being an aryloxy group having 6 to 20 carbon atoms is preferably an aryloxy group having 6 to 12 carbon atoms, and preferred examples thereof include a phenoxy group, a 4-methylphenoxy group, a 4-methoxyphenoxy group, a 2,6-dimethylphenoxy group, a 3,5-di-t-butylphenoxy group, and a 2,6-di-t-butylphenoxy group.

Among these, a more preferable substituent is a phenoxy group, a 3,5-di-t-butylphenoxy group, or a 2,6-dimethylphenoxy group, and particularly preferred are a phenoxy group and a 3,5-di-t-butylphenoxy group.

$R^1$ being an acyl group having 2 to 10 carbon atoms is preferably an acyl group having 2 to 8 carbon atoms, and preferred examples thereof include an acetyl group, a propionyl group, a butyryl group, an isobutyryl group, a valeryl group, an isovaleryl group, a pivaloyl group, and a benzoyl group.

Among these, a more preferable substituent is an acetyl group, a pivaloyl group, or a benzoyl group, and particularly preferred is a benzoyl group.

$R^1$ being an ester group having 2 to 10 carbon atoms (oxycarbonyl group; R—O—(C=O)—, R is an organic group) is preferably an ester group having 2 to 8 carbon atoms, and preferred examples thereof include a methoxycarbonyl group, an ethoxycarbonyl group, an n-propoxycarbonyl group, an isopropoxycarbonyl group, an n-butoxycarbonyl group, a t-butoxycarbonyl group, a (4-hydroxybutoxy)carbonyl group, a (4-glycidylbutoxy)carbonyl group, and a phenoxycarbonyl group.

Among these, examples of more preferable substituents include a methoxycarbonyl group, an ethoxycarbonyl group, and a (4-hydroxybutoxy)carbonyl group, and particularly preferred is a methoxycarbonyl group.

$R^1$ being an acyloxy group having 2 to 10 carbon atoms is preferably an acyloxy group having 2 to 8 carbon atoms, and preferred examples thereof include an acetoxy group, a propionyloxy group, a butyryloxy group, an isobutyryloxy group, a valeryloxy group, an isovaleryloxy group, a pivaloyloxy group, and a benzoyloxy group.

Among these, a more preferable substituent is an acetoxy group, a propionyloxy group, or a benzoyloxy group, and particularly preferred are an acetoxy group and a propionyloxy group.

Preferred examples of $R^1$ being a substituted amino group having 1 to 12 carbon atoms include a monomethylamino group, a dimethylamino group, a monoethylamino group, a diethylamino group, a monoisopropylamino group, a diisopropylamino group, a monophenylamino group, a diphenylamino group, a bis(trimethylsilyl)amino group, and a morpholinyl group.

Among these, a more preferable substituent is a dimethylamino group or a diphenylamino group.

Preferred examples of $R^1$ being a substituted amido group having 1 to 12 carbon atoms (R—(C=O)NH—, R is an organic group) include an acetamido group, a propionylamino group, a butyrylamino group, an isobutyrylamino group, a valerylamino group, an isovalerylamino group, a pivaloylamino group, and a benzoylamino group.

Among these, a more preferable substituent is an acetamido group, a propionylamino group, or a benzoylamino group, and particularly preferred is an acetamido group.

Preferred examples of $R^1$ being a substituted pyridyl group having 5 to 10 carbon atoms include a 2-pyridyl group, a 3-pyridyl group, a 2-(3-methyl)pyridyl group, a 2-(4-methyl)pyridyl group, a 3-(2-methyl)pyridyl group, a 3-(4-methyl)pyridyl group, a 2-(4-chloromethyl)pyridyl group, and a 3-(4-chloromethyl)pyridyl group.

Among these, examples of more preferable substituents include a 2-pyridyl group, a 3-pyridyl group, and a 2-(4-methyl)pyridyl group, and particularly preferred is a 2-pyridyl group.

Preferred examples of $R^1$ being a substituted pyrrolidyl group having 4 to 10 carbon atoms include a 2-pyrrolidyl group, a 3-pyrrolidyl group, a 2-(1-methyl)pyrrolidyl group, a 2-(1-butyl)pyrrolidyl group, a 2-(1-cyclopentenyl)pyrrolidyl group, a 2-(4-methoxycarbonyl)pyrrolidyl group, a 2-(5-methoxycarbonyl)pyrrolidyl group, and a 2-(6-methoxycarbonyl)pyrrolidyl group.

Among these, examples of more preferable substituents include a 2-pyrrolidyl group, a 3-pyrrolidyl group, a 2-(1-methyl)pyrrolidyl group, and a 2-(6-methoxycarbonyl)pyrrolidyl group, and particularly preferred is a 2-pyrrolidyl group.

Preferred examples of $R^1$ being a substituted piperidyl group having 5 to 10 carbon atoms include a 2-piperidyl group, a 3-piperidyl group, a 2-(1,2,3,6-tetrahydro)piperidyl group, a 2-(1-methyl)piperidyl group, a 2-(1-ethyl)piperidyl group, a 2-(4-methyl)piperidyl group, a 2-(5-methyl)piperidyl group, and a 2-(6-methyl)piperidyl group.

Among these, examples of more preferable substituents include a 2-piperidyl group, a 3-piperidyl group, a 2-(1,2,3,6-tetrahydro)piperidyl group, a 2-(6-methyl)piperidyl group, and particularly preferred are a 2-piperidyl group and a 2-(1,2,3,6-tetrahydro)piperidyl group.

Preferred examples of $R^1$ being a substituted hydrofuryl group having 4 to 10 carbon atoms include a 2-tetrahydrofuryl group, a 3-tetrahydrofuryl group, a 2-(5-methyl)tetrahydrofuryl group, a 2-(5-isopropyl)tetrahydrofuryl group, a 2-(5-ethyl)tetrahydrofuryl group, a 2-(5-methoxy)tetrahydrofuryl group, a 2-(5-acetyl)tetrahydrofuryl group, and a 2-(4,5-benzo)tetrahydrofuryl group.

Among these, examples of more preferable substituents include a 2-tetrahydrofuryl group, a 3-tetrahydrofuryl group, a 2-(5-methyl)tetrahydrofuryl group, a 2-(5-isopropyl)tetrahydrofuryl group, and a 2-(4,5-benzo)tetrahydrofuryl group, and particularly preferred are a 2-tetrahydrofuryl group, a 2-(5-methyl)tetrahydrofuryl group, and a 2-(5-isopropyl) tetrahydrofuryl group.

Preferred examples of $R^1$ being a substituted imidazolyl group having 4 to 10 carbon atoms include a 2-imidazolyl group, a 2-(1-methyl)imidazolyl group, a 2-(1-benzyl)imidazolyl group, a 2-(1-acetyl)imidazolyl group, a 2-(4,5-benzo)imidazolyl group, and a 2-(1-methyl-4,5-benzo)imidazolyl group.

Among these, examples of more preferable substituents include a 2-imidazolyl group, a 2-(1-methyl)imidazolyl group, and a 2-(4,5-benzo)imidazolyl group, and particularly preferred are a 2-(1-methyl)imidazolyl group and a 2-(4,5-benzo)imidazolyl group.

Preferred examples of $R^1$ being an alkylthio group having 1 to 10 carbon atoms include a methylthio group, an ethylthio group, a propylthio group, and a t-butylthio group, and preferred examples of $R^1$ being an arylthio group having 6 to 10 carbon atoms include a phenylthio group.

Among these, examples of more preferable substituents include a methylthio group, a t-butylthio group, and a phenylthio group, and particularly preferred are a methylthio group and a phenylthio group.

Preferred examples of $R^1$ being a halogen atom, include fluorine, chlorine and bromine. Among these, a more preferable substituent is chlorine.

Among the preferred groups of R, an alkoxy group having 1 to 10 carbon atoms, an ester group having 2 to 10 carbon atoms, and an acyloxy group having 2 to 10 carbon atoms are more preferable. Specific examples of the allyl monomer having a particularly preferable polar group represented by formula (1) include allyl acetate, allyl trifluoroacetate, allyl benzoate, allyl alcohol, allyl methyl ether, allyl bromide, and allyl chloride.

In the method for producing a copolymer according to the present invention, the allyl monomer having a polar group represented by formula (1) to be copolymerized with ethylene may be polymerized by combining two or more kinds thereof.

In the method for producing a copolymer according to the present invention, a third monomer may be used in addition to ethylene and the allyl monomer having a polar group represented by formula (1). Examples of third monomers include α-olefins, such as propylene, 1-butene, 1-pentene, 1-hexene, 4-methyl-1-pentene, 1-heptene, 1-octene, 1-nonene, 1-decene, and styrene; cyclic olefins, such as norbornene, cyclopentene, and cyclohexene; diene compounds, such as 1,3-butadiene, 1,4-pentadiene, 1,5-hexadiene, norbornadiene, cyclopentadiene, 1,4-cyclohexadiene, and 1,4-divinylbenzene; and olefins having a polar group, such as acrylic acid esters, methacrylic acid esters, vinyl acetate, vinyl ethers, acrylonitrile, and acrolein. These may be polymerized by combining two or more kinds thereof. When an α-olefin is copolymerized as the third monomer, the ratio of α-olefin to the total of α-olefin and ethylene contained in the obtained polymer is less than 40 mol %.

The content of the third monomer contained in the copolymer is preferably less than 5 mol %.

[Polymerization Method]

A method for copolymerizing ethylene and an allyl monomer having a polar group represented by formula (1) by using a metal complex represented by formula (C1), (C2), (C3), (C4) or (C5) as a catalyst is not particularly limited, and may be a commonly used polymerization method. That is, a process method, such as a solution polymerization method, a suspension polymerization method, and a gas phase polymerization method, may be used, and a solution polymerization method and a suspension polymerization method are particularly preferable. A polymerization mode may be either a batch mode or a continuous mode. The polymerization may be carried out in a single stage polymerization or in a multistage polymerization.

Two or more kinds of the metal complex catalyst represented by formula (C1), (C2), (C3), (C4) or (C5) may be mixed and used for the polymerization reaction. By using the mixture, it is possible to control the molecular weight, the molecular weight distribution and the content of the monomer unit derived from the monomer of formula (1) of the polymer, thereby obtaining a polymer suitable for a desired use. The molar ratio of the total amount of monomer to the total amount of metal complex catalyst is in the range of 1 to 10000000, preferably in the range of 10 to 1000000, more preferably in the range of 100 to 100000, in terms of a monomer/metal complex ratio.

The polymerization temperature is not particularly limited, but the polymerization is usually carried out in the range of −30 to 400° C., preferably in the range of 0 to 200° C., more preferably in the range of 30 to 150° C.

The polymerization pressure, in which the ethylene pressure occupies the majority of the internal pressure, is in the range of atmospheric pressure to 100 MPa, preferably in the range of atmospheric pressure to 20 MPa, more preferably in the range of atmospheric pressure to 10 MPa.

The polymerization time may be appropriately adjusted according to the process mode, the polymerization activity of the catalyst, etc., and a short reaction time of several tens of seconds to several minutes or a long reaction time of several thousands of hours is possible.

The atmosphere in the polymerization system is preferably filled with an inert gas, such as nitrogen gas or argon, so as not to mix air, oxygen, moisture, etc., other than the monomer, in order to prevent the activity of the catalyst from decreasing. In the case of solution polymerization, an inert solvent other than the monomer may be used. Examples of inert solvents include, but are not particularly limited to, aliphatic hydrocarbons, such as isobutane, pentane, hexane, heptane, and cyclohexane; aromatic hydrocarbons, such as benzene, toluene, and xylene; halogenated aliphatic hydrocarbons, such as chloroform, methylene chloride, carbon tetrachloride, dichloroethane, and tetrachloroethane; halogenated aromatic hydrocarbons, such as chlorobenzene, dichlorobenzene, and trichlorobenzene; aliphatic esters, such as methyl acetate and ethyl acetate; and aromatic esters, such as methyl benzoate and ethyl benzoate.

[Silane Compound]

In order to improve the catalytic activity, the method for producing a polymer according to the present invention is characterized in that a silane compound having one or more silicon-hydrogen bonds (Si—H) is allowed to coexist in the polymerization reaction system.

In olefin polymerization of ethylene, etc., using metal complex (C1), (C2), (C3), (C4) or (C5) as a catalyst, a polymer is grown by repeated coordination to the metal and insertion of a monomer, and the polymer is dissociated from the catalyst by a chain transfer reaction. It is generally known that a chain transfer reaction in polymerization using a metal complex of Group 10 of the Periodic Table proceeds by a mechanism represented by the following formula (in which R' represents a polymer chain, and a ligand of metal M is omitted). In the following formula, a polymerization example using ethylene as a monomer is described, but the same also applies to other olefin monomers. In a complex species formed by inserting ethylene into an M-R' complex species, β-hydride elimination proceeds to dissociate the polymer (CH$_2$=CH—R' in the formula) from the catalyst, and at the same time, a hydride complex species (M-H in the formula) is formed and the growth reaction is halted. Since this hydride complex species is highly reactive, the coordination and insertion reaction of the monomer immediately proceeds, and then the repolymerization begins.

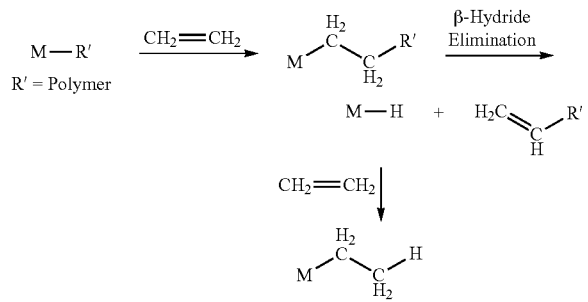

On the other hand, in polymerization of an allyl monomer having a polar group, such as allyl acetate, it has been found that the polymer growth reaction proceeds by repeating the coordination to the metal and insertion of the monomer, as with the aforementioned formula, but the mechanism of the chain transfer reaction is different. The mechanisms of the polymer growth reaction and the chain transfer reaction in the polymerization of an allyl monomer having a polar group are shown in the following formula (in which R' represents a polymer chain, Ac represents a CH$_3$C(=O)— group, and a ligand of metal M and substituents other than one hydrogen atom of a silane compound are omitted). In the following formula, a polymerization example using allyl acetate as a monomer is described, but the same also applies to other allyl monomers having a polar group represented by formula (1).

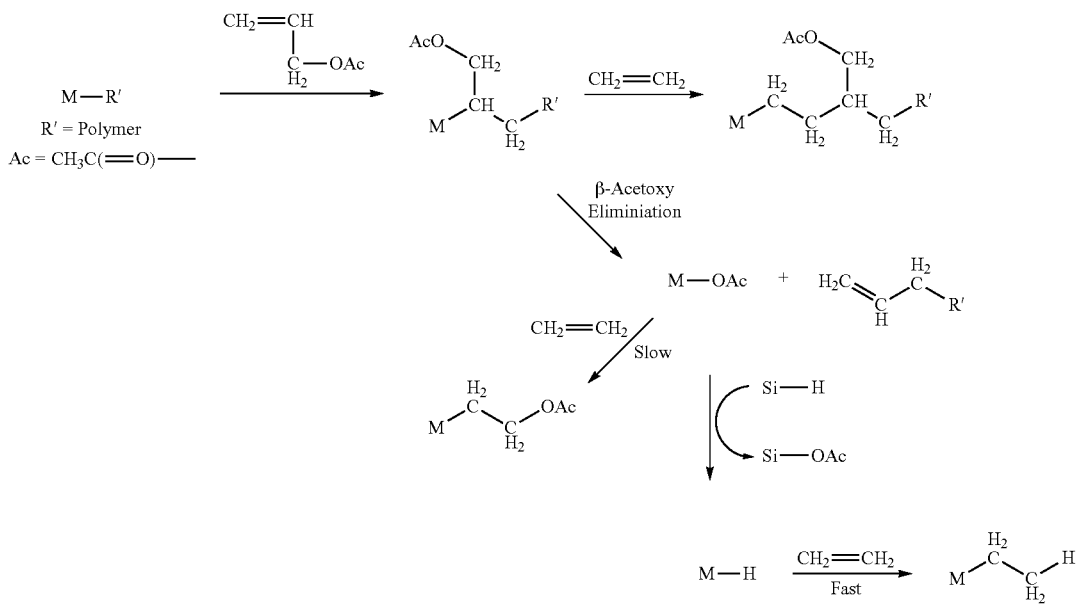

When allyl acetate is incorporated into the polymer, coordination of allyl acetate to metal M and insertion reaction into M-R' bond occur. Thereafter, the polymer is grown by coordination and insertion of monomers, such as ethylene and allyl acetate, with respect to the generated complex species. On the other hand, β-acetoxy elimination proceeds at a certain rate in competition with coordination and insertion of the following monomer with respect to the complex species formed by insertion of allyl acetate with respect to the M-R' complex species. This dissociates the polymer (CH$_2$=CH—CH$_2$—R' in the formula) from the catalyst to form an acetoxy complex species (M-OAc in the formula). Since this acetoxy complex species is much less reactive than the hydride complex species, initiation of repolymerization by coordination and insertion of a monomer with respect to the acetoxy complex species is rate-limiting. In the reaction system, since the acetoxy complex species is a dormant species, the catalyst exhibiting the catalytic activity is substantially a part of the charged amount, and the polymer productivity per catalyst is low.

In the method for producing a polymer according to the present invention, a silane compound having one or more silicon-hydrogen bonds (Si—H) is allowed to coexist in a polymerization system, whereby an acetoxy complex species which is a dormant species is converted into a hydride complex species by reacting with the silane compound. The hydride complex species improves reactivity with the monomer, as described above, and the repolymerization by coordination and insertion reaction of the monomer is easily started. This greatly improves the polymer productivity per catalyst, leading to a reduction in catalyst cost.

In the method for producing a polymer according to the present invention, it is essential that the silane compound coexisting in the polymerization system has one or more silicon-hydrogen bonds (Si—H). The silane compound is not particularly limited as long as it has a silicon-hydrogen bond, and a compound having a plurality of silicon atoms, such as a disilane compound, a trisilane compound, or a tetrasilane compound, may be used.

When the silane compound to coexist is a monosilane compound, the monosilane compound is preferably a silane compound represented by formula (2)

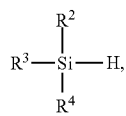
(2)

wherein $R^2$, $R^3$ and $R^4$ each independently represent a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms, and $R^2$, $R^3$ and $R^4$ may be bonded to each other to form a ring structure.

$R^2$, $R^3$ and $R^4$ each independently represent a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms.

Preferred examples of halogen atoms represented by $R^2$, $R^3$ or $R^4$ include fluorine, chlorine and bromine. Among these, fluorine is more preferable.

Preferred examples of alkoxy groups having 1 to 20 carbon atoms represented by $R^2$, $R^3$ or $R^4$ include a methoxy group, an ethoxy group, a 1-propoxy group, an isopropoxy group, a 1-butoxy group, a sec-butoxy group and a t-butoxy group. Among these, a methoxy group, an ethoxy group, a 1-propoxy group, and an isopropoxy group are more preferable.

Preferred examples of aryloxy groups having 6 to 20 carbon atoms represented by $R^2$, $R^3$ or $R^4$ include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, and a 3,6-dimethylphenoxy group. Among these, a phenoxy group is more preferable.

Preferred examples of substituted amino groups having 1 to 20 carbon atoms represented by $R^2$, $R^3$ or $R^4$ include a monomethylamino group, a dimethylamino group, a monoethylamino group, a diethylamino group, a mono(1-propyl) amino group, a di(1-propyl)amino group, a monoisopropylamino group, a diisopropylamino group, a mono(1-butyl) amino group, a di(1-butyl)amino group, a monophenylamino group, and a diphenylamino group. Among these, a monomethylamino group, a dimethylamino group, a monoethylamino group, and a diethylamino group are more preferable.

Preferred examples of substituted or unsubstituted alkyl groups having carbon atoms 1 to 30 represented by $R^2$, $R^3$ or $R^4$ include a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, a 1,1-dimethyl-2-phenylethyl group, an isopropyl group, a 1-dimethylpropyl group, a 1,1,2-trimethylpropyl group, a 1,1-diethylpropyl group, a 1-phenyl-2-propyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a neopentyl group, a 5-decyl group, a trifluoromethyl group, a pentafluoroethyl group, a heptafluoropropyl group, and a nonafluorobutyl group. Among these, a methyl group, an ethyl group, a 1-propyl group, an isopropyl group, and a t-butyl group are more preferable.

Preferred examples of substituted or unsubstituted cycloalkyl groups having 3 to 30 carbon atoms represented by $R^2$, $R^3$ or $R^4$ include a cyclopropyl group, a cyclobutyl group, a cyclopentyl group, a cyclohexyl group, a cycloheptyl group, and a cyclooctyl group. Among these, a cyclopentyl group and a cyclohexyl group are more preferable.

Preferred examples of substituted or unsubstituted aryl groups having 6 to 30 carbon atoms represented by $R^2$, $R^3$ or $R^4$ include a phenyl group, a naphthyl group, an anthracenyl group, a fluorenyl group, a 2-tolyl group, a 3-tolyl group, a 4-tolyl group, a xylyl group, a 2-ethylphenyl group, a 3-ethylphenyl group, a 4-ethylphenyl group, a 2-methoxyphenyl group, a 3-methoxyphenyl group, and a 4-methoxyphenyl group. Among these, a phenyl group, a 2-tolyl group, a 3-tolyl group, a 4-tolyl group, a 2-methoxyphenyl group, a 3-methoxyphenyl group, and a 4-methoxyphenyl group are more preferable.

$R^2$, $R^3$ and $R^4$ may be bonded to each other to form a ring structure.

It is preferable that $R^2$, $R^3$ and $R^4$ be unsubstituted alkyl groups having 1 to 30 carbon atoms, alkoxy groups having 1 to 20 carbon atoms, or substituted or unsubstituted aryl groups having 6 to 30 carbon atoms, in view of industrial availability and reactivity with a dormant species which is formed during the polymerization reaction, such as an acetoxy complex. More preferred are a trialkylsilane, a trialkoxysilane and a triarylsilane in which $R^2$, $R^3$ and $R^4$ are all identical. As the unsubstituted alkyl group, a methyl group, an ethyl group, a 1-propyl group, and an isopropyl group are preferable. As the alkoxy group, a methoxy group and an ethoxy group are preferable. As the unsubstituted aryl group, a phenyl group is preferable.

As the silane compound represented by formula (2), trimethylsilane, triethylsilane, tri(1-propyl)silane, triisopropylsilane, triethoxysilane, monophenylsilane, diphenylsilane, and triphenylsilane are particularly preferable. Two or more kinds of silane compounds may be mixed and used.

In the method for producing a copolymer according to the present invention, a method for adding the silane compound represented by formula (2) is not particularly limited, and the silane compound may be dissolved in a reaction solvent before the reaction or may be added after the reaction is started. The silane compound may be added by an intermittent feed in which addition is carried out at a predetermined reaction time or a continuous feed in which addition is continuously carried out.

The amount of the silane compound represented by formula (2) used is not particularly limited, but the optimum amount is determined by the reactivity of the silane compound with the catalyst used. The molar ratio of the total amount of silane compound added to the amount of metal complex catalyst is in the range of 1 to 1000, preferably in the range of 5 to 500, more preferably in the range of 10 to 300, in terms of a silane compound/metal complex ratio.

When the silane compound represented by formula (2) is added, the silane compound may be added alone or with the silane compound dissolved in an organic solvent. When the silane compound is dissolved in an organic solvent and added, the solvent used in the polymerization reaction is preferable as the organic solvent. When the allyl monomer having a polar group to be copolymerized with ethylene is a liquid at normal temperature, the silane compound may be dissolved in the allyl monomer and added.

EXAMPLES

Hereinafter, the present invention will be described in more detail with reference to Synthetic Examples, Examples, Comparative Examples, and Reference Examples, but the present invention is not limited to the following examples.

The average molecular weight, monomer unit content, and melting point of the polymer were measured, analyzed, and calculated by the following methods.

[Average Molecular Weight]

The number-average molecular weight and the weight-average molecular weight of copolymers obtained in Examples and Comparative Examples were calculated by size-exclusion chromatography (solvent: 1,2-dichlorobenzene, temperature: 145° C.) using a high-temperature GPC apparatus HLC-8121GPC/HT manufactured by Tosoh Corporation equipped with AT-806MS columns (two columns in series) manufactured by Showa Denko K.K., and using polystyrene as a standard material of molecular weight.

[Monomer Unit Content]

The content of monomer units derived from olefins having a polar group represented by formula (1) was determined by H-NMR at 120° C. using 1,1,2,2-tetrachloroethane-d2 as a solvent, and using JNM-ECS400 manufactured by JEOL Ltd.

[Melting Point]

The melting point of the copolymer was measured using Differential Scanning Calorimeter DSC6200 manufactured by Seiko Instruments Inc. A sheet-shaped sample piece was packed in a 5 mg aluminum pan, and once heated from room temperature to 200° C. at a rate of temperature rise of 100° C./min and held for 5 minutes, then cooled to 20° C. at 10° C./min and crystallized, and then heated to 200° C. at 10° C./min to obtain a melting curve. The peak top temperature of the main endothermic peak in the last temperature rising step carried out in order to obtain the melting curve was taken as the melting point.

Synthesis Example 1: Synthesis of Metal Complex 1

Using the method described in JP 2011-68881 A, metal complex 1 was synthesized according to the following reaction scheme.

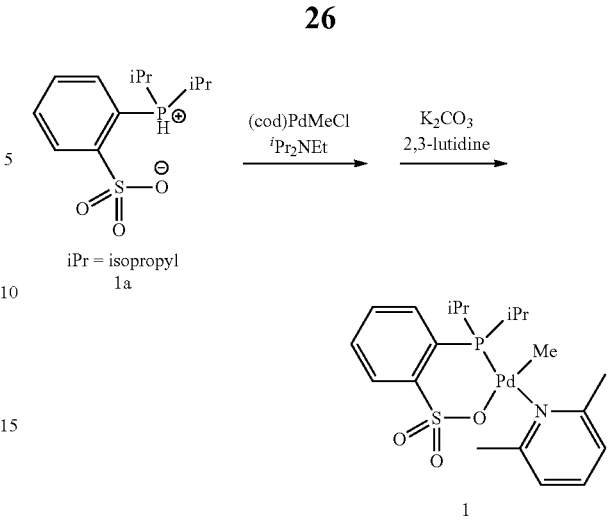

(a) Synthesis of 2-(diisopropylphosphonio)benzenesulfonate (Compound 1a)

To a solution of benzenesulfonic acid (21.7 g, 137 mmol) in THF (400 mL) was added n-butyllithium (1.6 M hexane solution, 174 mL, 274 mmol) at 0° C. and stirred at room temperature for 3 hours. After the reactor was cooled to −78° C., diisopropylphosphine chloride (19.0 g, 125 mmol) was added at −78° C. and stirred at room temperature for 15 hours. After quenching the reaction by adding trifluoroacetic acid (15.6 g, 137 mmol), the solvent was distilled off under reduced pressure. The residue was dissolved in dichloromethane and washed with saturated aqueous ammonium chloride. After the organic layer was dried over sodium sulfate, the solvent was distilled off under reduced pressure to obtain 2-(diisopropylphosphonio)benzenesulfonate (compound 1a) as white powder. Yield was 26.8 g (78%).

$^1$H-NMR (400 MHz, CDCl$_3$): δ 1.25 (dd, J=21.6, 7.0 Hz, 6H), 1.53 (dd, J=21.8, 7.2 Hz, 6H), 3.45 (m, 2H), 5.42 (br d, JPH=380 Hz), 7.58 (tdd, J=7.6, 2.8, 1.1 Hz, 1H), 7.69 (ddd, J=15.1, 7.7, 0.7 Hz, 1H), 7.83 (dd, J=7.6, 7.6 Hz, 1H), 8.27 (dd, J=7.5, 4.4 Hz, 1H); $^{13}$C-NMR (101 MHz, CDCl$_3$): δ 19.4 (s), 24.5-27.7 (m), 114.4 (br d, J=93 Hz), 129.1 (d, J=8.6 Hz), 130.3 (d, J=12.5 Hz), 134.7-137.1 (m), 150.7 (br s);

$^{31}$P-NMR (162 MHz, CDCl$_3$): δ 62.5 (d, JPH=380 Hz) (83%), 31.0 (d, JPH=460 Hz) (17%).

(b) Synthesis of Metal Complex 1

Under an argon atmosphere, (cod)PdMeCl (synthesized according to the literature; Inorg. Chem., 1993, 32, 5769-5778, cod=1,5-cyclooctadiene, 16.3 g, 62 mmol) was added to a methylene chloride solution (500 mL) of 2-(diisopropylphosphonio)benzenesulfonate (compound 1a; 16.3 g, 59 mmol) and N,N-diisopropylethylamine (38.3 g, 296 mmol) and stirred at room temperature for 2.5 hours. After concentrating the solution, the residue was dissolved in methylene chloride (200 mL) and this solution was added to a methylene chloride suspension (500 mL) of potassium carbonate (80.8 g, 585 mmol) and 2,6-lutidine (62.7 g, 585 mmol) and stirred at room temperature for 1 hour. After filtration of the reaction solution with Celite (dried diatomaceous earth) and Florisil (magnesium silicate), the solvent was concentrated and subjected to drying under reduced pressure. Further, recrystallization purification from methylene chloride/hexane was carried out to obtain metal complex 1 as white crystal. Yield was 18.9 g (61%).

$^1$H-NMR (400 MHz, CDCl$_3$): δ 0.34 (d, J=2.3 Hz, 3H), 1.32 (ddd, J=49.9, 16.0, 7.0 Hz, 12H), 2.58 (dt, J=22.3, 7.2 Hz, 2H), 3.18 (s, 6H), 7.12 (d, J=7.8 Hz, 2H), 7.46 (t, J=7.4 Hz, 1H), 7.53 (t, J=7.6 Hz, 1H), 7.58 (t, J=7.7 Hz, 2H), 8.29-8.32 (m, 1H);

$^{13}$C-NMR (101 MHz, CDCl$_3$): δ −10.10 (d, J=4.8 Hz), 18.44 (s), 19.29 (d, J=4.8 Hz), 25.91 (d, J=25.9 Hz), 26.20 (s), 122.72 (d, J=3.8 Hz), 124.56 (d, J=35.5 Hz), 129.19 (t, J=6.7 Hz), 131.03 (d, J=1.9 Hz), 132.39 (s), 138.30 (s), 151.13 (d, J=10.5 Hz), 159.17 (s);

$^{31}$P-NMR (162 MHz, CDCl$_3$): δ 34.4 (s).

Synthesis Example 2: Synthesis of Metal Complex 2

Using the method described in JP 2014-159540 A, metal complex 2 was synthesized according to the following reaction scheme.

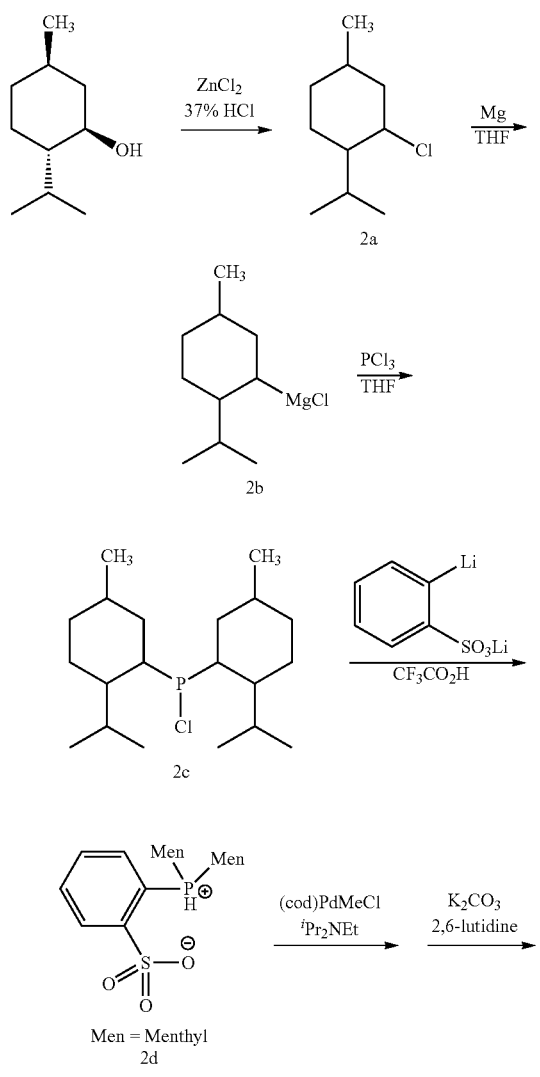

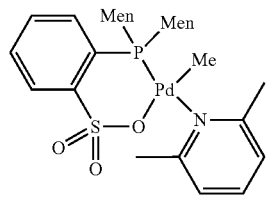

(a) Synthesis of Menthyl Chloride (Compound 2a)

Menthyl chloride (compound 2a) was synthesized according to the procedure described in the literature (J. Org. Chem., 17, 1116 (1952)). To a solution of zinc chloride (77 g, 0.56 mol) in 37% hydrochloric acid (52 mL, 0.63 mol) was added (−)-menthol (27 g, 0.17 mol) and stirred for 5 hours while being heated to 35° C. After cooling to room temperature, hexane (50 mL) was added to the reaction solution, and an organic layer and an aqueous layer were separated using a separatory funnel. The organic layer was washed with water (30 mL×1), followed by further washing with concentrated sulfuric acid (10 mL×5) and water (30 mL×5). The organic layer was dried over magnesium sulfate and concentrated under reduced pressure to obtain menthyl chloride (compound 2a) as colorless oil. Yield was 27 g (91%).

(b) Synthesis of Dimenthylphosphine Chloride (Compound 2c)

Dimenthylphosphine chloride (compound 2c) was synthesized according to the procedure described in the literature (Journal fur Praktische Chemie, 322, 485 (1980)). A solution of menthyl magnesium chloride (compound 2b) obtained by reacting menthyl chloride (compound 2a; 2.6 g, 15 mmol) and magnesium (0.63 g, 26 mmol) in tetrahydrofuran (THF) (30 mL) while being heated to 70° C. under an argon atmosphere was added to a solution of phosphorus trichloride (0.63 mL, 7.2 mmol) in THF (30 mL) at −78° C. After the temperature was raised to room temperature, the mixture was stirred for 2 hours while being heated to 70° C. After the solvent was distilled off under reduced pressure, the mixture was purified by distillation to obtain dimenthylphosphine chloride (compound 2c). Yield was 0.62 g (25%).

$^{31}$P-NMR (162 MHz, THF): δ 123.9.

(c) Synthesis of 2-(dimenthylphosphonio)benzenesulfonate (Compound 2d)

To a solution of benzenesulfonic acid (0.18 g, 1.2 mmol) in THF (10 mL) was added n-butyllithium (1.6 M hexane solution, 1.4 mL, 2.3 mmol) at 0° C. and stirred at room temperature for 1 hour. After the reactor was cooled to −78° C., dimenthylphosphine chloride (compound 2c; 0.36 g, 1.1 mmol) was added at −78° C. and stirred at room temperature for 15 hours. After quenching the reaction with trifluoroacetic acid (0.97 mL, 1.3 mmol), the solvent was distilled off under reduced pressure. The residue was dissolved in dichloromethane and washed with saturated aqueous ammonium chloride. After the organic layer was dried over sodium sulfate, the solvent was distilled off under reduced pressure to obtain 2-(dimenthylphosphonio)benzenesulfonate (compound 2d) as white powder. Yield was 0.31 g (63%).

$^1$H-NMR (500 MHz, CDCl$_3$): δ 8.27 (br s, 1H), 7.77 (t, J=7.3 Hz, 1H), 7.59-7.52 (m, 2H), 3.54 (br s, 1H), 2.76 (br s, 1H), 2.16 (br s, 1H), 1.86-1.38 (m, 12H), 1.22-0.84 (m, 22H), 0.27 (br s, 1H);

$^{31}$P{$^1$H}-NMR (162 MHz, CDCl$_3$): δ 45.1 (br.), −4.2 (br.).

(d) Synthesis of Metal Complex 2

Under an argon atmosphere, (cod)PdMeCl (synthesized according to the literature; Inorg. Chem., 1993, 32, 5769-5778, cod=1,5-cyclooctadiene, 0.079 g, 0.30 mmol) was added to a methylene chloride solution (10 mL) of 2-(dimenthylphosphonio)benzenesulfonate (compound 2d; 0.14 g, 0.30 mmol) and N,N-diisopropylethylamine (0.26 mL, 1.5 mmol) and stirred at room temperature for 1 hour. After concentrating the solution, the residue was dissolved in methylene chloride (10 mL) and this solution was added to a methylene chloride suspension (2 mL) of potassium carbonate (0.42 g, 3.0 mmol) and 2,6-lutidine (0.35 mL, 3.0 mmol) and stirred at room temperature for 1 hour. After filtration of the reaction solution with Celite (dried diatomaceous earth) and Florisil (magnesium silicate), the solvent was concentrated and subjected to drying under reduced pressure to obtain metal complex 2. Yield was 0.17 g (80%).

$^1$H-NMR (400 MHz, CDCl$_3$): δ 8.26 (ddd, J=7.8, 3.9, 1.4 Hz, 1H), 7.81 (t, J=7.9 Hz, 1H), 7.56 (t, J=7.7 Hz, 1H), 7.49 (t, J=7.6 Hz, 1H), 7.43 (t, J=7.4 Hz, 1H), 7.13 (d, J=7.8 Hz, 1H), 7.08 (d, J=7.6 Hz, 1H), 3.75 (s, 1H), 3.24 (s, 3H), 3.17 (s, 3H), 2.59 (s, 1H), 2.49-2.39 (m, 2H), 2.29-2.27 (m, 1H), 2.05-1.96 (m, 1H), 1.89-1.37 (m, 12H), 1.21-1.11 (m, 2H), 0.98 (d, J=6.6 Hz, 3H), 0.95 (d, J=6.2 Hz, 3H), 0.84 (d, J=6.6 Hz, 3H), 0.78 (d, J=6.6 Hz, 3H), 0.58 (d, J=6.6 Hz, 3H), 0.41 (d, J=2.3 Hz, 3H), 0.08 (d, J=6.6 Hz, 3H);

$^{31}$P-NMR (162 MHz, CDCl$_3$): δ 16.6.

Synthesis Example 3: Synthesis of Metal Complex 6

Metal complex 6 was synthesized according to the following reaction scheme.

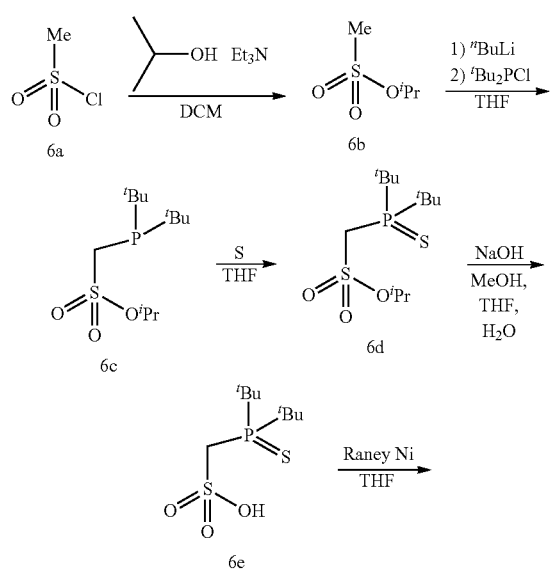

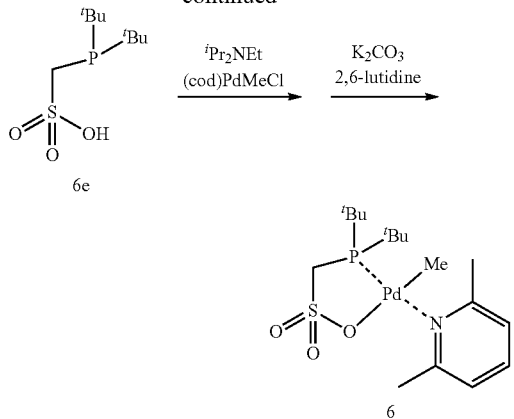

(a) Synthesis of Isopropyl Methanesulfonate (Compound 6b)

To a solution of methanesulfonic acid chloride (compound 6a; 20.0 g, 174.6 mmol) in dichloromethane (50 mL) were slowly added 2-propanol (10.5 g, 174.6 mmol, 1.0 eq) and a solution of triethylamine (44.2 g, 436.5 mmol, 2.5 eq) in dichloromethane (50 mL) at 0° C. and stirred at 25° C. for 16 hours. The reaction solution was filtered, and the collected filtrate was concentrated, then dissolved in dichloromethane (50 mL) again, and the reaction solution was washed with 1 M hydrochloric acid (20 mL), saturated aqueous sodium bicarbonate (20 mL), and saturated brine (20 mL). The solution was dried over anhydrous sodium sulfate, filtered, and concentrated to obtain the target substance (compound 6b) as yellow oil. Yield was 20.2 g (84%).

$^1$H-NMR (400 MHz, CDCl$_3$): δ 4.91 (m, 1H), 3.04 (s, 3H), 1.39 (s, 3H), 1.38 (s, 3H).

(b) Synthesis of Isopropyl di(t-butyl)phosphanylmethanesulfonate (Compound 6c)

To a solution of isopropyl methanesulfonate (compound 6b; 6.0 g, 43.4 mmol) in tetrahydrofuran (100 mL) was added n-butyllithium (2.5 M hexane solution, 45.6 mmol, 1.1 eq) at 0° C. and stirred at 0° C. for 1 hour. After the reactor was cooled to −78° C., di(t-butyl)phosphine chloride (7.8 g, 43.4 mmol, 1.0 eq) was added at −78° C. and stirred at room temperature for 16 hours. After the solvent was distilled off under reduced pressure, the mixture was purified by silica gel chromatography (pentane/ethyl acetate=20/1, volume ratio) and washed with pentane (5 mL×2 times) to obtain the target substance (compound 6c) as white powder. Yield was 3.6 g (29%).

$^1$H-NMR (400 MHz, CDCl$_3$): δ 5.00 (m, 1H), 3.26 (br, 2H), 1.41 (d, J=6.4 Hz, 6H), 1.19 (d, J=12.0 Hz, 18H);

$^{31}$P-NMR (162 MHz, CDCl$_3$): δ 18.4.

(c) Synthesis of Isopropyl di(t-butyl)(thio)phosphinomethanesulfonate (Compound 6d)

To a solution of isopropyl di(t-butyl)phosphanylmethanesulfonate (compound 6c; 3.58 g, 12.68 mmol) in THF (tetrahydrofuran) (40 mL) was added sulfur (2.5 M hexane solution, 2.03 g, 63.39 mmol, 5 eq) at −78° C., stirred at 25°

C. for 16 hours, and further stirred at 60° C. for 2 hours. The reaction solution was filtered, and the filtration residue was washed with ethyl acetate (20 mL), and all the solutions were collected and the solvent was distilled off under reduced pressure. Pentane (10 mL) was added, and the mixture was filtered and dried under reduced pressure to obtain the target substance (compound 6d) as white powder. Yield was 3.5 g (88%).

$^1$H-NMR (400 MHz, CDCl$_3$): δ 5.16 (m, 1H), 3.80 (br, 2H), 1.46 (d, J=6.4 Hz, 6H), 1.43 (d, J=12.0 Hz, 18H);
$^{31}$P-NMR (162 MHz, CDCl$_3$): δ 74.5.

(d) Synthesis of di(t-butyl)(thio)phosphinomethanesulfonic Acid (Compound 6e)

To a mixed solution of isopropyl di(t-butyl)(thio)phosphinomethanesulfonate (compound 6d; 5.5 g, 16.62 mmol) in methanol (40 mL), THF (20 mL), and water (5 mL) was added sodium hydroxide (2.66 g, 66.47 mmol, 4 eq) and stirred at 66° C. for 16 hours. The reaction solution was concentrated by distilling the solvents off therefrom, and then washed with ethyl acetate (20 mL), and the obtained white powder was suspended in a mixed solution of ethanol (100 mL) and dichloromethane (50 mL), and neutralized to pH=5 with HCl/ethyl acetate. The neutralized solution was filtered, the filtrate was concentrated, and then dissolved in dichloromethane, insoluble substances were removed by filtration, and the solvent was distilled off under reduced pressure to obtain the target substance (compound 6e) as pale yellow powder. Yield was 4.2 g (93%).

$^1$H-NMR (400 MHz, CDCl$_3$): δ 6.28 (br, 1H), 3.75 (d, J=6.4 Hz, 2H), 1.41 (d, J=16.8 Hz, 18H);
$^{31}$P-NMR (162 MHz, CDCl$_3$): δ 72.2.

(e) Synthesis of di(t-butyl)phosphanylmethanesulfonic Acid (Compound 6f)

To a solution of RANEY®-Ni (4.5 g, 52.5 mmol, 6.8 eq) in THF (100 mL) was slowly added a solution of di(t-butyl)(thio)phosphinomethanesulfonic acid (compound 3e; 2.1 g, 7.71 mmol, 1 eq) in THF (40 mL) using a syringe and stirred at room temperature for 16 hours. Dichloromethane (80 mL) was added to this reaction solution, followed by filtration, and the solvent was distilled off under reduced pressure. The reactants were suspended in dichloromethane (200 mL), insoluble substances were removed by filtration, and the solvent was distilled off under reduced pressure to obtain the target substance (compound 6f) as pink powder. Yield was 0.8 g (44%).

$^1$H-NMR (400 MHz, CDCl$_3$): δ 4.88 (br, 1H), 3.06 (d, J=3.2 Hz, 2H), 1.17 (d, J=11.2 Hz, 18H);
$^{31}$P-NMR (162 MHz, CDCl$_3$): δ 19.1.

(f) Synthesis of Metal Complex 6

To a solution of di(t-butyl)phosphanylmethanesulfonic acid (compound 6f; 0.95 g, 3.96 mmol) and N,N-diisopropylethylamine (3.5 mL, 19.8 mmol) in methylene chloride (30 mL) was added (cod)PdMeCl (cod=1,5-cyclooctadiene, 1.05 g, 3.96 mmol) and stirred at room temperature for 1 hour. After concentrating the solution, the residue was dissolved in dichloromethane (15 mL) and this solution was added to a dichloromethane suspension (10 mL) of potassium carbonate (5.47 g, 39.6 mmol) and 2,6-lutidine (4.61 mL, 39.8 mmol) and stirred at room temperature for 1 hour. After filtration of the reaction solution with Celite (dried diatomaceous earth) and Florisil (magnesium silicate), the solvent was concentrated and subjected to drying under reduced pressure. Washing with hexane (15 mL×3) gave metal complex 6. Yield was 1.2 g (63%).

$^1$H-NMR (400 MHz, CDCl$_3$): δ 7.57 (t, J=7.8 Hz, 1H), 7.11 (d, J=7.8 Hz, 2H), 3.44 (d, J=8.2 Hz, 2H), 3.06 (s, 6H), 1.49 (d, J=14.6 Hz, 18H), 0.54 (d, J=1.9 Hz, 3H);
$^{31}$P-NMR (162 MHz, CDCl$_3$): δ 46.5.

Synthesis Example 4: Synthesis of Metal Complex 7

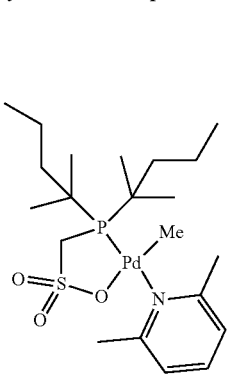

Except that di(t-butyl)phosphine chloride which is a raw material of compound 6c in Synthesis Example 3 was changed to di(2-methyl-2-pentyl)phosphine chloride, metal complex 7 was synthesized in the same manner as the synthesis procedure of metal complex 6 described above.

$^1$H-NMR (400 MHz, CDCl$_3$): δ 7.57 (t, J=7.6 Hz, 1H), 7.11 (d, J=8.0 Hz, 2H), 3.48 (d, J=7.6 Hz, 2H), 3.07 (s, 6H), 1.95-1.85 (m, 4H), 1.55-1.45 (m, 16H), 0.98 (t, J=7.2 Hz, 6H), 0.53 (d, J=2.0 Hz, 3H);
$^{31}$P-NMR (162 MHz, CDCl$_3$): δ 50.9.

Synthesis Example 5: Synthesis of Metal Complex 8

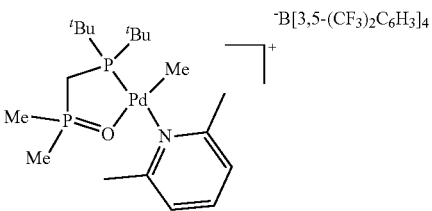

Metal complex 8 was synthesized using the method described in WO 2013/168626.

$^1$H-NMR (400 MHz, CD$_2$Cl$_2$): δ 7.74 (s, 8H), 7.66 (t, J=7.7 Hz, 1H), 7.57 (s, 4H), 7.19 (d, J=7.8 Hz, 2H), 2.97 (s, 6H), 2.35 (dd, J$_1$=J$_2$=9.7 Hz, 2H), 1.70 (d, J=12.8 Hz, 6H), 1.45 (d, J=14.9 Hz, 18H), 0.63 (d, J=2.1 Hz, 3H);
$^{31}$P-NMR (162 MHz, CD$_2$Cl$_2$): δ 58.01 (d, J=8.7 Hz), 53.25 (d, J=8.7 Hz).

[Synthesis of Polymers]

Copolymerization of allyl acetate and ethylene was carried out using metal complexes 1-2 and 6-8 synthesized in Synthesis Examples 1-5.

The catalyst concentration, productivity, and catalytic activity were calculated by the following formulae.

$$\text{Productivity (g/mmol)} = \frac{\text{Yield of obtained polymer (g)}}{\text{Molar number of metal complex catalyst used (mmol)}}$$

$$\text{Catalytic activity (g/mmol·h)} = \frac{\text{Yield of obtained polymer (g)}}{\text{Molar number of metal complex catalyst used (mmol)} \times \text{reaction time (h)}}$$

Example 1: Copolymerization of Allyl Acetate and Ethylene in the Coexistence of Triethylsilane Using Metal Complex 1 (Preparation of Polymer 1)

Allyl acetate (150 mL, 1,390 mmol) as a monomer represented by formula (1) and triethylsilane (46.5 mg, 0.40 mmol) as a silane compound having one or more silicon-hydrogen bonds were added to a 500 mL autoclave containing metal complex 1 (10.0 mg, 0.020 mmol) under a nitrogen gas atmosphere. After charging with ethylene (0.79 MPa), the autoclave was stirred at 65° C. for 24 hours. After cooling to room temperature, the reaction solution in the autoclave was added to methanol (500 mL) to precipitate a copolymer. The resulting copolymer was collected by filtration, washed with methanol, and dried under reduced pressure to obtain polymer 1. Yield was 1.1 g. The productivity was calculated to be 55 g/mmol and the catalytic activity was calculated to be 2.3 g/(mmol h). The molecular weight of polymer 1 was measured by size-exclusion chromatography. The number-average molecular weight was 2200, the weight-average molecular weight was 8800, and Mw/Mn was 4.0. The allyl acetate content in the copolymer was determined to be 100:22.0 (allyl acetate molar fraction=18.0%) for ethylene:allyl acetate by $^1$H-NMR measurement. The polymerization conditions and results are shown in Tables 1 and 2, respectively.

Comparative Example 1: Copolymerization of Allyl Acetate and Ethylene Using Metal Complex 1 (Preparation of Comparative Polymer 1)

Copolymerization of allyl acetate and ethylene was carried out in the same manner as in Example 1 except that triethylsilane was not added. The polymerization conditions and results are shown in Tables 1 and 2, respectively.

Example 2: Copolymerization of Allyl Acetate and Ethylene in the Coexistence of Triethylsilane Using Metal Complex 2 (Preparation of Polymer 2)

Copolymerization of allyl acetate and ethylene was carried out in the same manner as in Example 1 except that metal complex 2 was used as a catalyst instead of metal complex 1. The polymerization conditions and results are shown in Tables 1 and 2, respectively.

Comparative Example 2: Copolymerization of Allyl Acetate and Ethylene Using Metal Complex 1 (Preparation of Comparative Polymer 2)

Copolymerization of allyl acetate and ethylene was carried out in the same manner as in Example 1 except that metal complex 2 was used as a catalyst instead of metal complex 1, and triethylsilane was not added. The polymerization conditions and results are shown in Tables 1 and 2, respectively.

TABLE 1

| Examples | Catalyst Type | mg | mmol | Ethylene MPa | Formula (1) Allyl acetate mL | Formula (2) Triethylsilane mg | mmol | Reaction Temp. °C. | Reaction Time h |
|---|---|---|---|---|---|---|---|---|---|
| Ex. 1 | Metal complex 1 | 10.0 | 0.020 | 0.79 | 150 | 46.5 | 0.40 | 65 | 24 |
| Comp. Ex. 1 | Metal complex 1 | 10.0 | 0.020 | 0.79 | 150 | 0 | 0 | 65 | 24 |
| Ex. 2 | Metal complex 2 | 13.9 | 0.020 | 0.51 | 150 | 46.5 | 0.40 | 65 | 24 |
| Comp. Ex. 2 | Metal complex 2 | 13.9 | 0.020 | 0.51 | 150 | 0 | 0 | 65 | 24 |

TABLE 2

| Examples | Polymer No. | Yield g | Productivity g/mmol | Catalytic activity g/(mmol · h) | Molecular weight Mn | Molecular weight Mw | Molecular weight Mw/Mn | Allyl acetate content mol % |
|---|---|---|---|---|---|---|---|---|
| Ex. 1 | 1 | 1.10 | 55 | 2.30 | 2200 | 8800 | 4.0 | 18.0 |
| Comp. Ex. 1 | Comp. 1 | 0.69 | 35 | 1.40 | 1900 | 8500 | 4.4 | 18.7 |
| Ex. 2 | 2 | 0.52 | 26 | 1.10 | 24000 | 65000 | 2.7 | 20.0 |
| Comp. Ex. 2 | Comp. 2 | 0.41 | 21 | 0.88 | 27000 | 66000 | 2.4 | 20.3 |

Comparison between the results of Example 1 and Comparative Example 1 and the results of Example 2 and Comparative Example 2 revealed that the productivity of the polymer and the catalytic activity were improved by allowing triethylsilane having a silicon-hydrogen bond to coexist in the polymerization reaction system. The molecular weight and the allyl acetate content of the obtained polymer were nearly unchanged even when triethylsilane coexisted.

Next, copolymerization of allyl acetate and ethylene was carried out by changing the addition method and the addition amount of the silane compound. The polymerization conditions and results are shown in Tables 3 and 4, respectively.

Example 3: Copolymerization of Allyl Acetate and Ethylene in the Coexistence of Triethylsilane Using Metal Complex 2 (Preparation of Polymer 3)

Metal complex 2 was used as a catalyst, and triethylsilane was sequentially added at a predetermined reaction time instead of coexistence from the start of the reaction to carry out copolymerization of allyl acetate and ethylene. Allyl acetate (150 mL, 1,390 mmol) was added as a monomer represented by formula (1) into a 500 mL autoclave containing metal complex 2 (13.9 mg, 0.020 mmol) under a nitrogen gas atmosphere. After charging with ethylene (0.51 MPa), the autoclave was stirred at 65° C. to start the reaction. At 2, 5, 8, and 22 hours after the start of the reaction, a solution of triethylsilane (4.7 mg, 0.040 mmol) in allyl acetate (5.4 mL, 50.0 mmol) was pumped into the autoclave, respectively, and the reaction was terminated at 24 hours after the start. Immediately after the addition of triethylsilane, an increase in the ethylene consumption rate was observed, and it was confirmed that the polymerization reaction was accelerated. After the completion of the reaction, and after cooling to room temperature, the reaction solution in the autoclave was added to methanol (500 mL) to precipitate a copolymer. The resulting copolymer was collected by filtration, washed with methanol, and dried under reduced pressure to obtain polymer 3. Yield was 1.0 g. The productivity was calculated to be 52 g/mmol and the catalytic activity was calculated to be 2.2 g/(mmol h). The molecular weight of polymer 3 was determined by size-exclusion chromatography, and calculated to be a number-average molecular weight of 25,000 and a weight-average molecular weight of 73,000, with an Mw/Mn of 2.9. The allyl acetate content in the copolymer was determined to be 100:24.2 (allyl acetate molar fraction=19.5%) for ethylene: allyl acetate by $^1$H-NMR measurement.

Examples 4-7: Copolymerization of Allyl Acetate and Ethylene in the Coexistence of Triethylsilane Using Metal Complex 2 (Preparation of Polymers 4-7)

Copolymerization of allyl acetate and ethylene was carried out in the same manner as in Example 3 except that the amount of triethylsilane added and the addition time were changed.

TABLE 3

| Examples | Catalyst Type | Catalyst mg | Catalyst mmol | Ethylene MPa | Formula (1) Allyl acetate mL | Formula (2) Triethylsilane Total added amount mg | Formula (2) Triethylsilane Total added amount mmol | Formula (2) Triethylsilane Added amount per addition mg | Formula (2) Triethylsilane Added amount per addition mmol | Formula (2) Triethylsilane Reaction time at the time of addition h | Reaction Temp. ° C. | Reaction Time h |
|---|---|---|---|---|---|---|---|---|---|---|---|---|
| Ex. 3 | Metal complex 2 | 13.9 | 0.020 | 0.51 | 150 | 18.6 | 0.2 | 4.7 | 0.04 | 2, 5, 8, 22 | 65 | 24 |
| Ex. 4 | Metal complex 2 | 13.9 | 0.020 | 0.51 | 150 | 46.5 | 0.4 | 11.6 | 0.10 | 2, 5, 8, 22 | 65 | 24 |
| Ex. 5 | Metal complex 2 | 13.9 | 0.020 | 0.51 | 150 | 93.0 | 0.8 | 23.2 | 0.20 | 2, 5, 8, 22 | 65 | 24 |
| Ex. 6 | Metal complex 2 | 13.9 | 0.020 | 0.51 | 150 | 186.0 | 1.6 | 46.5 | 0.40 | 2, 5, 8, 22 | 65 | 24 |
| Ex. 7 | Metal complex 2 | 13.9 | 0.020 | 0.51 | 150 | 105.0 | 0.9 | 11.6 | 0.10 | 2, 3.5, 5, 6.5, 8, 9.5, 11, 21, 22.5 | 65 | 24 |

TABLE 4

| Examples | Polymer No. | Yield g | Productivity g/mmol | Catalytic activity g/(mmol · h) | Molecular weight | | | Allyl acetate content mol % |
|---|---|---|---|---|---|---|---|---|
| | | | | | Mn | Mw | Mw/Mn | |
| Ex. 3 | 3 | 1.0 | 52 | 2.2 | 25000 | 73000 | 2.9 | 19.5 |
| Ex. 4 | 4 | 1.5 | 73 | 3.0 | 22000 | 71000 | 3.2 | 19.5 |
| Ex. 5 | 5 | 1.6 | 78 | 3.3 | 21000 | 68000 | 3.2 | 19.5 |
| Ex. 6 | 6 | 1.2 | 62 | 2.6 | 16000 | 64000 | 3.9 | 19.9 |
| Ex. 7 | 7 | 2.3 | 116 | 4.8 | 18000 | 70000 | 3.8 | 20.3 |

From the results of Examples 3-7 and Example 1, it was found that when triethylsilane was successively added during the reaction, rather than allowed to coexist from the start of the polymerization reaction, the effects of improving the productivity and the catalytic activity were superior. From the results of Examples 3-7, it was also clarified that there are an addition interval and an addition amount of triethylsilane suitable for obtaining the effects of improving the productivity and the catalytic activity.

Example 8: Copolymerization of Allyl Acetate and Ethylene in the Coexistence of Monophenylsilane Using Metal Complex 2 (Preparation of Polymer 8)

Copolymerization of allyl acetate and ethylene was carried out by using monophenylsilane instead of triethylsilane, and changing the amount of monophenylsilane added and the addition time. Allyl acetate (150 mL, 1,390 mmol) was added as a monomer represented by formula (1) into a 500 mL autoclave containing metal complex 2 (13.9 mg, 0.020 mmol) under a nitrogen gas atmosphere. After charging with ethylene (0.51 MPa), the autoclave was stirred at 65° C. to start the reaction. After the start of the reaction, a solution of monophenylsilane (2.2 mg, 0.020 mmol) in allyl acetate (5.4 mL, 50.0 mmol) at 2 hours, a solution of monophenylsilane (6.5 mg, 0.060 mmol) in allyl acetate (5.4 mL, 50.0 mmol) at 5 hours, a solution of monophenylsilane (10.8 mg, 0.10 mmol) in allyl acetate (5.4 mL, 50.0 mmol) at 8 hours, and a solution of monophenylsilane (10.8 mg, 0.10 mmol) in allyl acetate (5.4 mL, 50.0 mmol) at 22 hours were pumped into the autoclave, respectively, and the reaction was terminated at 24 hours after the start. Immediately after the addition of monophenylsilane, an increase in the ethylene consumption rate was observed, and it was confirmed that the polymerization reaction was accelerated. After the completion of the reaction, and after cooling to room temperature, the reaction solution in the autoclave was added to methanol (500 mL) to precipitate a copolymer. The resulting copolymer was collected by filtration, washed with methanol, and dried under reduced pressure to obtain polymer 8. Yield was 1.1 g. The productivity was calculated to be 54 g/mmol and the catalytic activity was calculated to be 2.3 g/(mmol h). The molecular weight of polymer 8 was determined by size-exclusion chromatography, and calculated to be a number-average molecular weight of 21,000 and a weight-average molecular weight of 71,000, with an Mw/Mn of 3.4. The allyl acetate content in the copolymer was determined to be 100:24.2 (allyl acetate molar fraction=19.3%) for ethylene:allyl acetate by $^1$H-NMR measurement.

From the results of Example 8, it was found that even monophenylsilane, which has a plurality of silicon-hydrogen bonds, exhibits the same effect as triethylsilane as the silane compound used in the method for producing a polymer according to the present invention. Further, copolymerization of allyl acetate and ethylene was carried out by changing the substituents on the silicon atom of the silane compound represented by formula (2) ($R^2$, $R^3$ and $R^4$ in formula (2)). The polymerization conditions and the polymerization results are shown in Table 5 and Table 6, respectively.

Example 9: Copolymerization of Allyl Acetate and Ethylene in the Coexistence of Triethylsilane Using Metal Complex 2 (Preparation of Polymer 9)

Metal complex 2 (34.7 mg, 50 µmol) was weighed into a 30 mL flask which was sufficiently substituted with nitrogen gas, dehydrated toluene (10 mL) was added thereto, and the mixture was stirred for 10 minutes to prepare a catalyst solution. Next, the interior of a stainless-steel autoclave equipped with an inductive stirrer having an internal volume of 2.4 L was substituted with nitrogen gas, and toluene (969 mL) and allyl acetate (31 mL, 287 mmol) were introduced into the autoclave. After the polymerization temperature was raised to 80° C. and ethylene (1.4 MPa) was charged, the catalyst solution prepared above was added to start the polymerization. Twenty minutes after the start of the reaction, a solution of triethylsilane ($R^2$=$R^3$=$R^4$=an ethyl group, 232.6 mg, 2.0 mmol) in toluene (10 mL) was pumped into the autoclave and the reaction was allowed to proceed for an additional 60 minutes.

After the completion of the polymerization, ethylene was purged, the autoclave was cooled to room temperature, and the obtained polymer was reprecipitated using ethanol (1 L). The solid polymer obtained by filtration was dried under reduced pressure at 70° C. for 3 hours to collect 15.6 g of the copolymer. The productivity was calculated to be 312 g/mmol and the catalytic activity was calculated to be 234 g/(mmol h). The molecular weight of the obtained polymer was determined by size-exclusion chromatography, and calculated to be a number-average molecular weight of 332,000 and a weight-average molecular weight of 783,000, with an Mw/Mn of 2.4. The allyl acetate content in the copolymer was determined to be 100:0.32 (allyl acetate molar fraction=0.32%) for ethylene:allyl acetate by $^1$H-NMR measurement. The melting point was 126.1° C.

Example 10: Copolymerization of Allyl Acetate and Ethylene in the Coexistence of Triphenylsilane Using Metal Complex 2 (Preparation of Polymer 10)

Copolymerization of allyl acetate and ethylene was carried out in the same manner as in Example 9 except that triphenylsilane ($R^2=R^3=R^4=$a phenyl group) was used instead of triethylsilane.

Example 11: Copolymerization of Allyl Acetate and Ethylene in the Coexistence of Triisopropylsilane Using Metal Complex 2 (Preparation of Polymer 11)

Copolymerization of allyl acetate and ethylene was carried out in the same manner as in Example 9 except that triisopropylsilane ($R^2=R^3=R^4=$an isopropyl group) was used instead of triethylsilane.

Comparative Example 3: Copolymerization of Allyl Acetate and Ethylene Using Metal Complex 2 (Preparation of Comparative Polymer 3)

Copolymerization of allyl acetate and ethylene was carried out in the same manner as in Example 9 except that triethylsilane was not added.

Next, in order to examine a method for adding the silane compound, copolymerization of allyl acetate and ethylene was carried out while adding the silane compound to the reaction system by a continuous feed method.

Example 12: Copolymerization of Allyl Acetate and Ethylene in the Coexistence of Triethylsilane Using Metal Complex 2 (Preparation of Polymer 12)

By using metal complex 2 as a catalyst, copolymerization of allyl acetate and ethylene was carried out while adding triethylsilane by a continuous feed method. Allyl acetate (150 mL, 1,390 mmol) was added as a monomer represented by formula (1) into a 500 mL autoclave containing metal complex 2 (13.9 mg, 0.020 mmol) under a nitrogen gas atmosphere. After charging with ethylene (0.51 MPa), the autoclave was stirred at 65° C. to start the reaction. The feed of triethylsilane was started from 1 hour after the start of the reaction. The feed of triethylsilane was carried out using a liquid feed pump (PU-2085 pump manufactured by JASCO Corporation) and a solution of triethylsilane (39.1 mmol/L) in allyl acetate was added at a flow rate of 1.3 mL/h. The reaction was terminated at 24 hours after the start of the reaction. The total amount of triethylsilane added was 141.9 mg, 1.22 mmol. After the completion of the reaction, and after cooling to room temperature, the reaction solution in

TABLE 5

| Examples | Catalyst Type | mg | mmol | Ethylene MPa | Solvent Toluene mL | Formula (1) Allyl acetate mL | Formula (2) Silane compound Type | Added amount mg | mmol | Reaction time at the time of addition min | Reaction Temp. ° C. | Reaction Time min |
|---|---|---|---|---|---|---|---|---|---|---|---|---|
| Ex. 9 | Metal complex 2 | 34.7 | 0.050 | 1.40 | 969 | 31 | Triethylsillane | 232.6 | 2.0 | 20 | 80 | 80 |
| Ex. 10 | Metal complex 2 | 34.7 | 0.050 | 1.40 | 969 | 31 | Triphenylsilane | 520.8 | 2.0 | 20 | 80 | 80 |
| Ex. 11 | Metal complex 2 | 34.7 | 0.050 | 1.40 | 969 | 31 | Triisopropylsilane | 316.7 | 2.0 | 20 | 80 | 80 |
| Comp. Ex. 3 | Metal complex 2 | 34.7 | 0.050 | 1.40 | 969 | 31 | — | 0.0 | 0.0 | 20 | 80 | 80 |

TABLE 6

| Examples | Polymer No. | Yield g | Productivity g/mmol | Catalytic activity g/(mmol · h) | Molecular weight Mn | Mw | Mw/Mn | Allyl acetate content mol % | Melting point ° C. |
|---|---|---|---|---|---|---|---|---|---|
| Ex. 9 | 9 | 15.6 | 312 | 234 | 332000 | 783000 | 2.4 | 0.32 | 126.1 |
| Ex. 10 | 10 | 29.5 | 590 | 443 | 470000 | 1114000 | 2.4 | 0.30 | 127.4 |
| Ex. 11 | 11 | 32.7 | 654 | 491 | 462000 | 1063000 | 2.3 | 0.31 | 127.7 |
| Comp. Ex. 3 | Comp. 3 | 10.9 | 218 | 164 | 471000 | 1065000 | 2.3 | 0.28 | 127.3 |

From the results of Examples 9-11 and Comparative Example 3, it was found that even triphenylsilane and triisopropylsilane as the silane compound used in the method for producing a polymer according to the present invention showed an effect of improving the catalytic activity as with triethylsilane.

the autoclave was added to methanol (500 mL) to precipitate a copolymer. The resulting copolymer was collected by filtration, washed with methanol, and dried under reduced pressure to obtain polymer 12. Yield was 2.4 g. The productivity was calculated to be 120 g/mmol and the catalytic activity was calculated to be 5.0 g/(mmol h). The molecular weight of polymer 12 was determined by size-exclusion chromatography, and calculated to be a number-average molecular weight of 27,000 and a weight-average molecular weight of 76,000, with an Mw/Mn of 2.8. The allyl acetate content in the copolymer was determined to be 100:24.1 (allyl acetate molar fraction=19.4%) for ethylene:allyl acetate by 1H-NMR measurement. The results are shown in Table 7.

Example 13: Copolymerization of Allyl Acetate and Ethylene in the Coexistence of Triethoxysilane Using Metal Complex 2 (Preparation of Polymer 13)

Copolymerization of allyl acetate and ethylene was carried out in the same manner as in Example 12 except that triethoxysilane was used instead of triethylsilane.

TABLE 7

| Examples | Polymer No. | Yield g | Productivity g/mmol | Catalytic activity g/(mmol · h) | Molecular weight | | | Allyl acetate content mol % |
|---|---|---|---|---|---|---|---|---|
| | | | | | Mn | Mw | Mw/Mn | |
| Ex. 12 | 12 | 2.4 | 120 | 5 | 27000 | 76000 | 2.8 | 19.4 |
| Ex. 13 | 13 | 3.9 | 196 | 8 | 28000 | 77000 | 2.7 | 19.3 |

Example 14: Copolymerization of Allyl Acetate and Ethylene in the Coexistence of Tris(Trimethylsiloxy)Silane Using Metal Complex 2 (Preparation of Polymer 14)

Copolymerization of allyl acetate and ethylene was carried out in the same manner as in Example 4 except that tris(trimethylsiloxy)silane was used instead of triethylsilane to obtain polymer 14. The productivity was calculated to be 99 g/mmol and the catalytic activity was calculated to be 4.1 g/(mmol h). The molecular weight of polymer 14 was determined by size-exclusion chromatography, and calculated to be a number-average molecular weight of 23,000 and a weight-average molecular weight of 75,000, with an Mw/Mn of 3.2. The allyl acetate content in the copolymer was determined to be 100:23.5 (allyl acetate molar fraction=19.0%) for ethylene:allyl acetate by $^1$H-NMR measurement.

From the above results, it was clarified that the effect of improving the catalytic activity was similarly exhibited in both the intermittent feed method shown in Examples 3-11 and Example 14 and the continuous feed method shown in Examples 12-13 as the method for adding the silane compound.

Examples 15-17 and Comparative Examples 4-5

Copolymerization of allyl acetate and ethylene in the coexistence of a silane compound using metal complexes 6-8 was carried out. The specific procedures were as follows. The polymerization conditions and the polymerization results are shown in Table 8 and Table 9, respectively.

Example 15: Copolymerization of Allyl Acetate and Ethylene in the Coexistence of Triisopropylsilane Using Metal Complex 6 (Preparation of Polymer 15)

Metal complex 6 was used as a catalyst, and triisopropylsilane was sequentially added at a predetermined reaction time to carry out copolymerization of allyl acetate and ethylene. Allyl acetate (150 mL, 1,390 mmol) was added as a monomer represented by formula (1) into a 500 mL autoclave containing metal complex 6 (9.4 mg, 0.020 mmol) under a nitrogen gas atmosphere. After charging with ethylene (1.75 MPa), the autoclave was stirred at 65° C. to start the reaction. At 2 and 9 hours after the start of the reaction, a solution of triisopropylsilane (63.3 mg, 0.40 mmol) in allyl acetate (5.4 mL, 50.0 mmol) was pumped into the autoclave, respectively, and the reaction was terminated at 24 hours after the start. Immediately after the addition of triisopropylsilane, an increase in the ethylene consumption rate was observed, and it was confirmed that the polymerization reaction was accelerated. After the completion of the reaction, and after cooling to room temperature, the reaction solution in the autoclave was added to methanol (500 mL) to precipitate a copolymer. The resulting copolymer was collected by filtration, washed with methanol, and dried under reduced pressure to obtain polymer 15. Yield was 1.6 g. The productivity was calculated to be 78 g/mmol and the catalytic activity was calculated to be 3.3 g/(mmol h). The molecular weight of polymer 15 was determined by size-exclusion chromatography, and calculated to be a number-average molecular weight of 14,000 and a weight-average molecular weight of 37,000, with an Mw/Mn of 2.6. The allyl acetate content in the copolymer was determined to be 100:25.3 (allyl acetate molar fraction=20.2%) for ethylene:allyl acetate by 1H-NMR measurement.

Examples 16-17: Copolymerization of Allyl Acetate and Ethylene in the Coexistence of Triisopropylsilane Using Metal Complexes 7-8 (Preparation of Polymers 16-17)

Copolymerization of allyl acetate and ethylene was carried out in the same manner as in Example 15 except that metal complex 7 or 8 was used instead of metal complex 6 and the ethylene pressure was changed.

Comparative Examples 4-6: Copolymerization of Allyl Acetate and Ethylene Using Metal Complexes 6-8 (Preparation of Comparative Copolymers 4-6)

Copolymerization of allyl acetate and ethylene was carried out in the same manner as in Example 15, except that any of metal complexes 6 to 8 was used as the metal complex, triisopropylsilane was not added, and the ethylene pressure was changed.

TABLE 8

| | Catalyst | | | Ethylene | Formula (1) Allyl acetate | Formula (2) Triisopropylsilane | | | | | Reaction Temp. | Reaction Time |
| | | | | | | Total added amount | | Added amount per addition | | Reaction time at the time of addition | | |
| Examples | Type | mg | mmol | MPa | mL | mg | mmol | mg | mmol | h | °C. | h |
|---|---|---|---|---|---|---|---|---|---|---|---|---|
| Ex. 15 | Metal complex 6 | 9.4 | 0.020 | 1.75 | 150 | 126.6 | 0.80 | 63.3 | 0.40 | 2, 9 | 65 | 24 |
| Comp. Ex. 4 | Metal complex 6 | 9.4 | 0.020 | 1.75 | 150 | 0.0 | 0.00 | 0.0 | 0.00 | — | 65 | 24 |
| Ex. 16 | Metal complex 7 | 10.5 | 0.020 | 1.33 | 150 | 126.6 | 0.80 | 63.3 | 0.40 | 2, 9 | 65 | 24 |
| Comp. Ex. 5 | Metal complex 7 | 10.5 | 0.020 | 1.33 | 150 | 0.0 | 0.00 | 0.0 | 0.00 | — | 65 | 24 |
| Ex. 17 | Metal complex 8 | 26.6 | 0.020 | 2.98 | 150 | 126.6 | 0.80 | 63.3 | 0.40 | 2, 9 | 65 | 24 |
| Comp. Ex. 6 | Metal complex 8 | 26.6 | 0.020 | 2.98 | 150 | 0.0 | 0.00 | 0.0 | 0.00 | — | 65 | 24 |

TABLE 9

| Examples | Polymer No. | Yield g | Productivity g/mmol | Catalytic activity g/(mmol · h) | Molecular weight | | | Allyl acetate content mol % |
| | | | | | Mn | Mw | Mw/Mn | |
|---|---|---|---|---|---|---|---|---|
| Ex. 15 | 15 | 1.6 | 78 | 3.3 | 14000 | 37000 | 2.6 | 20.2 |
| Comp. Ex. 4 | Comp. 4 | 0.80 | 40 | 1.7 | 18000 | 39000 | 2.2 | 20.4 |
| Ex. 16 | 16 | 2.1 | 105 | 4.4 | 15000 | 35000 | 2.3 | 19.4 |
| Comp. Ex. 5 | Comp. 5 | 0.94 | 47 | 2.0 | 14000 | 33000 | 2.3 | 21.5 |
| Ex. 17 | 17 | 1.4 | 68 | 2.8 | 5300 | 16000 | 3.0 | 26.2 |
| Comp. Ex. 6 | Comp. 6 | 0.84 | 42 | 1.8 | 4200 | 16000 | 3.7 | 21.8 |

Comparison of the results of Example 15 and Comparative Example 4, Example 16 and Comparative Example 5, and Example 17 and Comparative Example 6 revealed that even when any of metal complexes 6 to 8 was used as a catalyst, the productivity and the catalytic activity were improved by allowing the silane compound to coexist.

Next, in order to clarify the reaction mechanism of the copolymerization reaction between ethylene and an allyl monomer having a polar group represented by formula (1) and the mechanism of improving the catalytic activity in the coexistence of a silane compound having a silicon-hydrogen bond, the following reaction experiments were carried out.

Reference Example 1: Reaction of Metal Complex 1 and Allyl Acetate

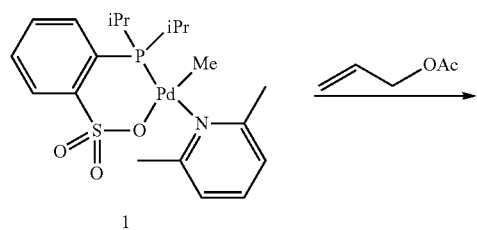

1

-continued

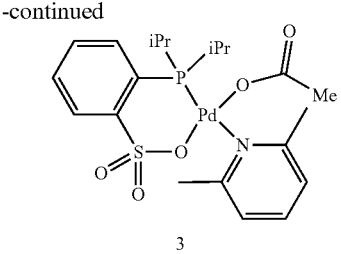

3

Metal complex 1 was reacted with allyl acetate in the same manner as described in WO 2012/029432 (U.S. Pat. No. 8,889,805). Under a nitrogen atmosphere, a suspension of metal complex 1 (1.2 g, 2.4 mmol) in toluene (94 mL)/allyl acetate (94 mL) was heated to 80° C. and stirred for 2 hours. After concentrating the reaction solution, methylene chloride (10 mL) was added to the residue, and the precipitate was removed by filtration using a syringe filter. Hexane (15 mL) was slowly added to the filtrate, and recrystallization was carried out. The precipitated crystals were collected by filtration, washed with t-butyl methyl ether and hexane, and dried under reduced pressure to obtain yellow crystals. Yield was 1.1 g. Analysis of H-NMR and $^{13}$C-NMR spectra identified the resulting compound as acetoxy metal complex 3 in the above formula. Yield was calculated to be 83%.

$^{1}$H-NMR (400 MHz, CDCl$_{3}$): δ 1.36-1.52 (m, 12H), 1.75 (s, 3H), 2.51-2.60 (m, 2H), 3.42 (s, 6H), 7.06 (d, 2H, J=7.2 Hz), 7.55-7.64 (m, 4H), 8.20 (br, 1H);

$^{13}$C-NMR (101 MHz, CDCl$_{3}$): δ 17.7 (s), 17.8 (s), 22.5 (s), 24.5 (s, CH$_{3}$ of lutidine), 25.0 (d, $^{1}J_{PC}$=26.5 Hz), 121.4 (d, $^{1}J_{PC}$=39.8 Hz), 122.6 (s), 128.5 (d, $J_{PC}$=5.7 Hz), 129.8 (d, $J_{PC}$=5.8 Hz), 131.6 (s), 131.8 (s), 138.5 (s), 148.5 (d, $^{2}J_{PC}$=8.3 Hz), 159.8 (s), 176.7 (s).

In Reference Example 1, acetoxy metal complex 3 was formed by the reaction between metal complex 1, which is an alkyl complex, and allyl acetate, suggesting that acetoxy metal complex 3 was also formed during the copolymerization reaction of allyl acetate and ethylene using metal complex 1.

[Comparison of Polymerization Reaction Rates of Metal Complexes 1 and 3]

In order to compare the initial reaction rates of metal complex 1 in which R$^{5}$ of formula (1) is a methyl group (referred to as "methyl metal complex 1") and metal complex 3 in which R$^{5}$ is an acetoxy group (referred to as "acetoxy metal complex 3") in the copolymerization of allyl acetate and ethylene, copolymerization of allyl acetate and ethylene was carried out in a short time using methyl metal complex 1 or acetoxy metal complex 3.

Reference Example 2: Copolymerization of Allyl Acetate and Ethylene Using Methyl Metal Complex 1

A catalyst solution was prepared by weighing 50 μmol of methyl metal complex 1 into a 30 mL flask which was sufficiently substituted with nitrogen gas, adding dehydrated toluene (10 mL), and stirring the mixture for 10 minutes. Next, the interior of a stainless-steel autoclave equipped with an inductive stirrer having an internal volume of 2.4 L was substituted with nitrogen gas, and purified toluene and allyl acetate (comonomer concentration: 0.287 mol/L) were introduced into the autoclave so as to obtain a total liquid volume of 1 L. After the polymerization temperature was raised to 80° C. and ethylene (1.4 MPa) was charged, the catalyst solution prepared above was added to carry out the polymerization for 20 minutes.

After the completion of the polymerization, ethylene was purged, the autoclave was cooled to room temperature, and the obtained polymer was reprecipitated using ethanol (1 L). The solid polymer obtained by filtration was dried under reduced pressure at 70° C. for 3 hours to collect 4.3 g of the copolymer. The productivity was calculated to be 86 g/mmol and the catalytic activity was calculated to be 258 g/(mmol h). The molecular weight of the obtained polymer was determined by size-exclusion chromatography, and calculated to be a number-average molecular weight of 10,000 and a weight-average molecular weight of 20,000, with an Mw/Mn of 2.0. The melting point was 128.5° C.

Reference Example 3: Copolymerization of Allyl Acetate and Ethylene Using Acetoxy Metal Complex 3

Copolymerization reaction of allyl acetate and ethylene was carried out in the same manner as in Reference Example 2 except that 100 μmol of acetoxy metal complex 3 was used instead of 50 mol of methyl metal complex 1.

The copolymer recovery was 0.8 g, the productivity was calculated to be 8 g/mmol, and the catalytic activity was calculated to be 23 g/(mmol h). The obtained polymer had a number-average molecular weight of 9,500, and a weight-average molecular weight of 20,000, with an Mw/Mn of 2.1. The melting point was 128.3° C.

Comparison of the catalytic activities of Reference Example 2 and Reference Example 3 revealed that the (initial) polymerization activity of acetoxy metal complex 3 was less than one tenth of that of methyl metal complex 1. This would suggest that, with respect to an acetoxy metal complex which is considered to be formed during the copolymerization reaction of allyl acetate and ethylene, repolymerization by monomer insertion is slow, and the acetoxy metal complex is a dormant species.

Reference Example 4: Reaction of Acetoxy Metal Complex 3 with Triethylsilane

In order to understand the reactivity between the acetoxy metal complex and the silane compound, the reaction behavior of acetoxy metal complex 3 in the presence of triethylsilane was examined.

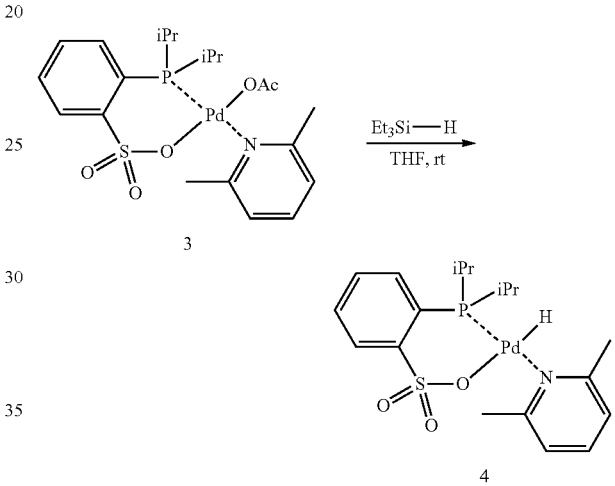

Under a nitrogen gas atmosphere, acetoxy metal complex 3 (0.02 g, 0.03 mmol), THF-d8 (0.5 mL), and triethylsilane (0.035 g, 0.30 mmol, 10 eq) were mixed in an NMR tube (φ5 mm) at room temperature. The formation of hydride metal complex 4 was observed by NMR measurement after 30 minutes.

$^{1}$H-NMR (400 MHz, CDCl$_{3}$): δ 8.17-8.14 (m, 1H), 7.65 (dd, J=7.7 Hz, 2H), 7.46 (dd, J=7.4 Hz, 2H), 7.19 (d, J=7.1 Hz, 2H), 3.01 (s, 6H), 2.65-2.53 (m, 2H), 1.28-1.18 (m, 12H), —19.30 (d, J=3.3 Hz, 1H);

$^{31}$P-NMR (162 MHz, CDCl$_{3}$): δ 53.0.

Reference Example 5: Reaction of Acetoxy Metal Complex 3 and Triethylsilane in the Presence of Methyl Acrylate

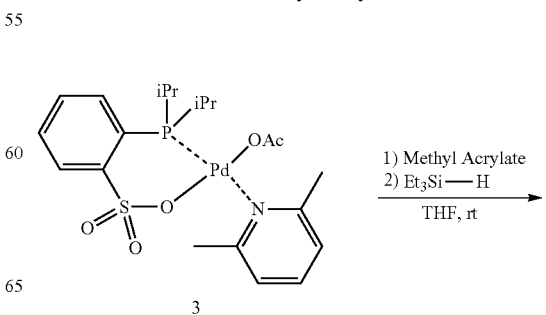

-continued

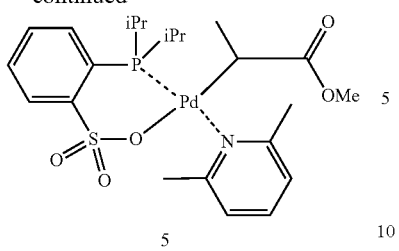

5

Under a nitrogen gas atmosphere, methyl acrylate (1.7 mL, 18.4 mmol, 10 eq) was added to a solution of acetoxy metal complex 3 (1.0 g, 1.8 mmol) in tetrahydrofuran (40 mL), followed by addition of triethylsilane (2.9 mL, 18.4 mmol, 10 eq), and stirred at room temperature for 15 hours. The reaction solution was concentrated to about ⅓ volume under reduced pressure, and then subjected to reprecipitation by adding hexane (30 mL). The precipitate was collected, washed three times with hexane (20 mL), and dried under reduced pressure to obtain light yellow green powder.

The tetrahydrofuran (40 mL) extract of the powder was filtered through Celite (dried diatomaceous earth), the solvent of the filtrate was distilled off under reduced pressure, and the residue was washed with hexane (15 mL) and diethyl ether (10 mL), and reprecipitated with a mixed solution of tetrahydrofuran and diethyl ether. The precipitate was collected and dried under reduced pressure to obtain pale yellow metal complex 5. Yield was 0.4 g (38%).

$^1$H-NMR (400 MHz, CDCl$_3$): δ 8.26-8.23 (m, 1H), 7.64-7.46 (m, 4H), 7.11 (dd, J=7.5 Hz, 2H), 3.41 (s, 3H), 3.28 (s, 3H), 3.4 (s, 3H), 3.04-2.98 (m, 1H), 2.68-2.62 (m, 1H), 1.48 (dd, J=7.0, 14.3 Hz, 3H), 1.40 (dd, J=7.3, 16.5 Hz, 3H), 1.36 (dd, J=7.0, 15.3 Hz, 6H), 0.93 (dd, J=3.1, 6.9 Hz, 3H);
$^{31}$P-NMR (162 MHz, CDCl$_3$): δ 28.3.

The results of Reference Example 4 and Reference Example 5 suggest that in the copolymerization of allyl acetate and ethylene, an acetoxy metal complex formed and present as a dormant species reacts with a silane compound having a silicon-hydrogen bond to be converted to a hydride complex thereby accelerating the repolymerization. In other words, it is understood that, even in the case of an acetoxy metal complex, the initial polymerization activity of which is inferior to a methyl metal complex, the catalytic activity can be restored by adding a silane compound.

From the results of the above Examples, Comparative Examples, and Reference Examples, in the method for producing a copolymer of ethylene and an allyl monomer having a polar group according to the present invention, the repolymerization of the catalyst is successfully accelerated thereby greatly improving the productivity and the catalytic activity by allowing a silane compound having a silicon-hydrogen bond to coexist in the polymerization reaction system. This makes it possible to reduce the production cost of the polymer, and thus the present invention is industrially useful.

The invention claimed is:
1. A method for producing a copolymer of ethylene and an allyl monomer having a polar group represented by formula (1)

(1)

wherein R$^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group having 2 to 10 carbon atoms (oxycarbonyl group; R—O—(C=O)—, R is an organic group), an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom, or a copolymer of ethylene, the allyl monomer having a polar group represented by formula (1) and another monomer, wherein the method comprises polymerizing ethylene and the allyl monomer having a polar group represented by formula (1) in the presence of a metal complex represented by formula (C1)

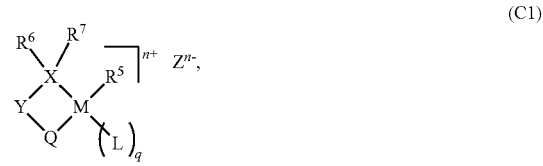
(C1)

wherein M represents an element of Group 10 of the Periodic Table, X represents a phosphorus atom (P) or an arsenic atom (As), and Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—SiH$_2$—), Q represents an anionic ligand selected from —S(=O)$_2$—O—, —C(=O)—O—, —P(=O)(—OH)—O—, —O—, and —S—, or a neutral ligand selected from —P(—R$^8$)(—R$^9$)=O, and —C(—R$^{10}$)=O, wherein R$^8$, R$^9$ and R$^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group, wherein the bonding mode is Y—S(=O)$_2$—O-M, Y—C(=O)—O-M, Y—P(=O)(—OH)—O-M, Y—O-M, Y—S-M, Y—P(—R$^8$)(—R$^9$)=O-M, or Y—C(—R$^{10}$)=O-M, R$^5$ represents a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms, R$^6$ and R$^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group, and may be bonded to each other to form a ring structure, L represents an electron-donating ligand and $R^5$ and L may form a ring, q is 0, ½, 1 or 2, n represents the charge of an organometallic compound and is 0 or 1, $Z^{n-}$ represents a counteranion of a cationic organometallic compound and when n is 0, it is not present, as a catalyst and by allowing a silane compound having one or more silicon-hydrogen bonds (Si—H) to coexist during polymerization.

2. The method for producing a copolymer according to claim 1, wherein the silane compound having one or more silicon-hydrogen bonds (Si—H) is a silane compound represented by formula (2)

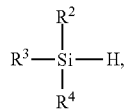
(2)

wherein $R^2$, $R^3$ and $R^4$ each independently represent a substituent selected from the group consisting of a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, and a substituted or unsubstituted aryl group having 6 to 30 carbon atoms, and $R^2$, $R^3$ and $R^4$ may be bonded to each other to form a ring structure.

3. The method for producing a copolymer according to claim 2, wherein $R^2$, $R^3$ and $R^4$ in formula (2) are each independently a hydrogen atom, an alkoxy group having 1 to 20 carbon atoms, a substituted or unsubstituted alkyl group having 1 to 30 carbon atoms, or a substituted or unsubstituted aryl group having 6 to 30 carbon atoms.

4. The method for producing a copolymer according to claim 1, wherein n is 0 and Q is $Q^1$ in formula (C1), that is, the catalyst used is a metal complex represented by formula (C2)

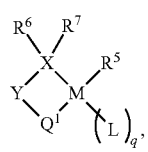
(C2)

wherein X, Y, M, L, q, $R^5$, $R^6$ and $R^7$ represent the same meanings as described in formula (C1) and $Q^1$ represents an anionic ligand selected from —S(=O)$_2$—O—, —C(=O)—O—, —P(=O)(—OH)—O—, —O—, and —S—.

5. The method for producing a copolymer according to claim 4, wherein $Q^1$ in formula (C2) is —S(=O)$_2$—O—, that is, the catalyst used is a metal complex represented by formula (C4)

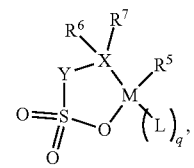
(C4)

wherein X, Y, M, L, q, $R^5$, $R^6$ and $R^7$ represent the same meanings as described in formula (C1).

6. The method for producing a copolymer according to claim 4, wherein Y in formula (C2) is a substituted or unsubstituted phenylene group, a substituted or unsubstituted methylene group, or a substituted or unsubstituted imino group.

7. The method for producing a copolymer according to claim 4, wherein $R^6$ and $R^7$ in formula (C2) are both an alkyl group having 3 to 20 carbon atoms.

8. The method for producing a copolymer according to claim 1, wherein n is 1 and Q is $Q^2$ in formula (C1), that is, the catalyst used is a metal complex represented by formula (C3)

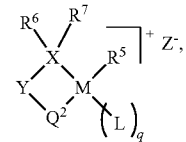
(C3)

wherein X, Y, M, L, q, $R^5$, $R^6$, $R^7$, and Z have the same meanings as described in formula (C1), and $Q^2$ represents a neutral ligand selected from —P(—$R^8$)(—$R^9$)=O, and —C(—$R^{10}$)=O, wherein $R^8$, $R^9$ and $R^{10}$ represent the same meanings as described in formula (C1).

9. The method for producing a copolymer according to claim 8, wherein Y in formula (C3) is a substituted or unsubstituted phenylene group, a substituted or unsubstituted methylene group, or a substituted or unsubstituted imino group.

10. The method for producing a copolymer according to claim 8, wherein $R^6$ and $R^7$ in formula (C3) are both an alkyl group having 3 to 20 carbon atoms.

11. The method for producing a copolymer according to claim 8, wherein Z in formula (C1) and formula (C3) is one selected from SbF$_6$, BPh$_4$, BArF$_4$ (ArF$_4$=[3,5-(CF$_3$)$_2$C$_6$H$_3$]$_4$), BF$_4$ and PF$_6$.

12. The method for producing a copolymer according to claim 1, wherein the allyl monomer having a polar group represented by formula (1) is allyl acetate ($R^1$ in formula (1) is an acetoxy group (CH$_3$C(=O)—O—)).

13. The method for producing a copolymer according to claim 1, wherein, in a copolymerization reaction of ethylene and the allyl monomer having a polar group represented by formula (1), or in a copolymerization reaction of ethylene, the allyl monomer having a polar group represented by formula (1), and another monomer, the silane compound having one or more silicon-hydrogen bonds is added by continuous feed or intermittent feed after the start of the polymerization reaction.

14. The method for producing a copolymer according to claim 1, wherein Z in formula (C1) is one selected from SbF$_6$, BPh$_4$, BArF$_4$ (ArF$_4$=[3,5-(CF$_3$)$_2$C$_6$H$_3$]$_4$), BF$_4$ and PF$_6$.

* * * * *